United States Patent
Hashimoto et al.

(10) Patent No.: US 7,021,154 B2
(45) Date of Patent: Apr. 4, 2006

(54) FORCE SENSING ELEMENT

(75) Inventors: Shoji Hashimoto, Seto (JP); Kouji Tsukada, Seto (JP); Kentaro Mizuno, Nisshin (JP); Jiro Sakata, Nagoya (JP); Yoshiteru Omura, Seto (JP); Yumi Masuoka, Aichi-gun (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

(21) Appl. No.: 10/659,294

(22) Filed: Sep. 11, 2003

(65) Prior Publication Data

US 2004/0055390 A1    Mar. 25, 2004

(30) Foreign Application Priority Data

Sep. 24, 2002 (JP) ............................ 2002-277628
Oct. 10, 2002 (JP) ............................ 2002-297126

(51) Int. Cl.
*G01B 7/16* (2006.01)

(52) U.S. Cl. ........................................................ 73/777

(58) Field of Classification Search ................. 73/777, 73/760, 763, 774, 781, 862.381, 862.474, 73/862.68, 862.621
See application file for complete search history.

(56) References Cited

U.S. PATENT DOCUMENTS

| | | | | |
|---|---|---|---|---|
| 3,145,563 A | * | 8/1964 | Hollander, Jr. ........... | 73/862.08 |
| 3,251,222 A | * | 5/1966 | Fenner ..................... | 73/777 |
| 4,144,747 A | * | 3/1979 | Datwyler, Jr. ............ | 73/862.59 |
| 4,546,658 A | * | 10/1985 | Rocha et al. ............. | 73/862.59 |
| 4,833,929 A | * | 5/1989 | Omura et al. ............. | 73/862.68 |
| 4,993,266 A | * | 2/1991 | Omura et al. ............. | 73/720 |
| 5,341,688 A | * | 8/1994 | Morikawa et al. ........ | 73/862.68 |
| 5,349,873 A | * | 9/1994 | Omura et al. ............. | 73/862.68 |
| 5,499,541 A | * | 3/1996 | Hopf et al. ............... | 73/763 |
| 5,526,700 A | * | 6/1996 | Akeel ...................... | 73/862.043 |
| 5,578,766 A | * | 11/1996 | Kondo ..................... | 73/862.68 |
| 5,773,728 A | | 6/1998 | Tsukada et al. | |
| 6,450,040 B1 | * | 9/2002 | Dorsch et al. ............ | 73/777 |
| 6,617,764 B1 | * | 9/2003 | Sebastian et al. ........ | 310/329 |
| 2003/0177839 A1 | * | 9/2003 | Tsukada et al. .......... | 73/774 |

FOREIGN PATENT DOCUMENTS

JP    A 8-271363    10/1996
JP    A 2001-305001    10/2001

* cited by examiner

*Primary Examiner*—Max Noori
(74) *Attorney, Agent, or Firm*—Oliff & Berridge, PLC

(57) ABSTRACT

A force sensing element is provided with a gauge portion and a plurality of electrodes. The gauge portion is formed of an n-type semiconductor substrate whose (100)-face serves as a main face, a p-type semiconductor substrate whose (110)-face serves as a main face, or a p-type semiconductor substrate whose (111)-face serves as a main face, and is pressed in a thickness direction of the semiconductor substrate upon receiving a force. The electrodes are electrically connected to the gauge portion such that a current path extending in a direction corresponding to the thickness direction of the semiconductor substrate is formed in the gauge portion. The force sensing element thus constructed makes it possible to detect a force with high precision.

15 Claims, 20 Drawing Sheets

F I G. 11
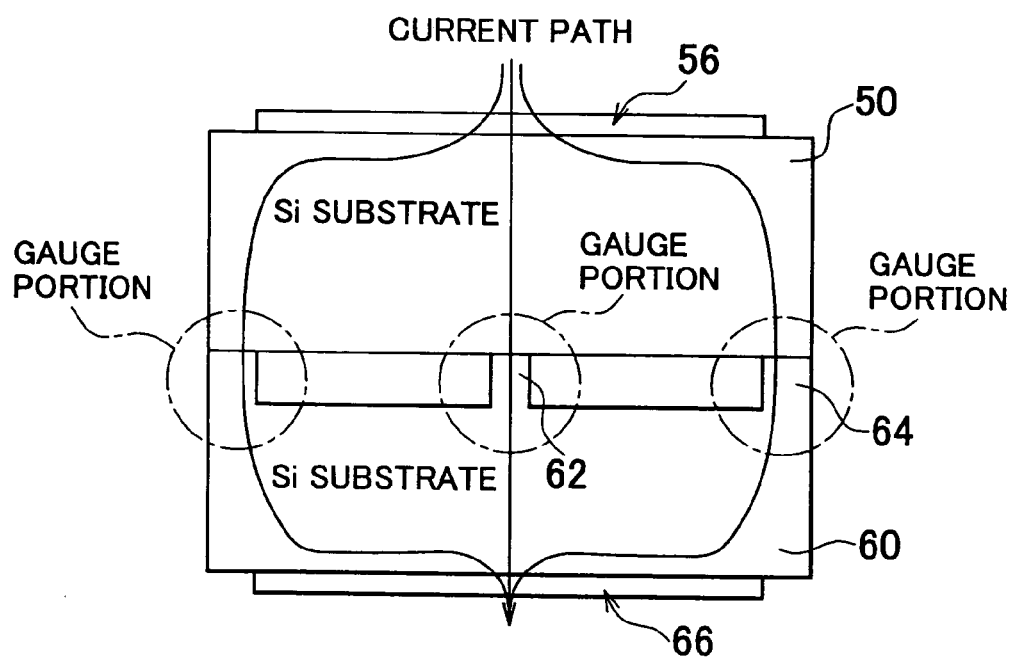
F I G. 12
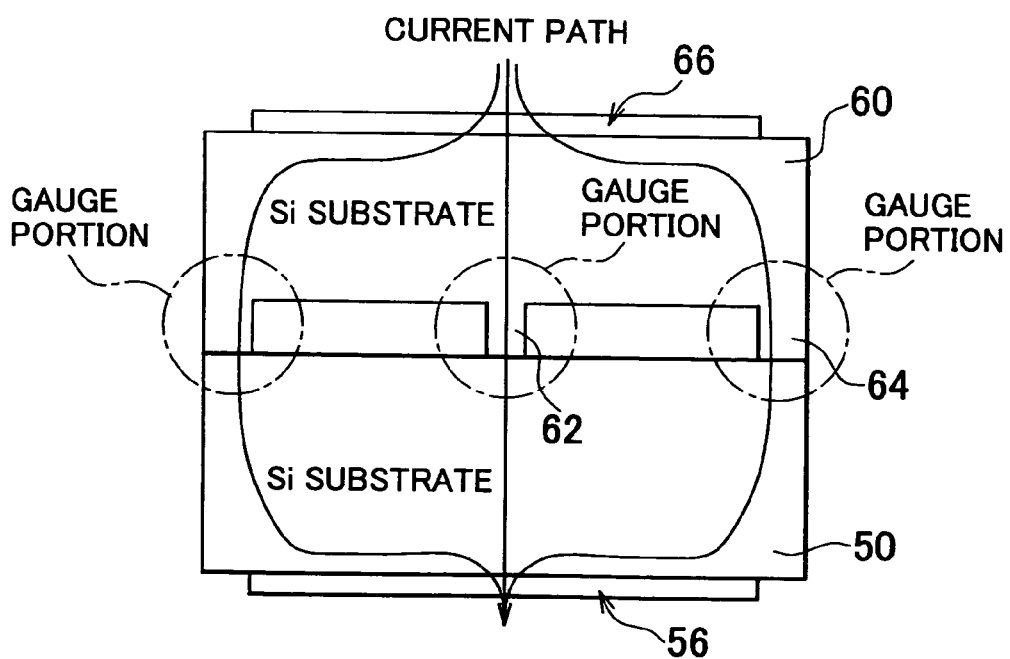

F I G. 26
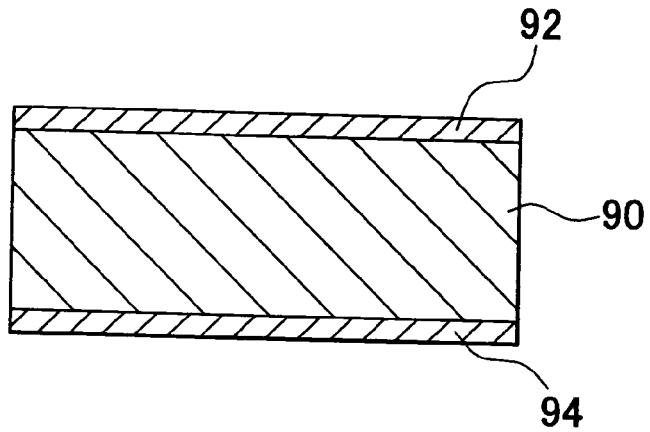
F I G. 27A
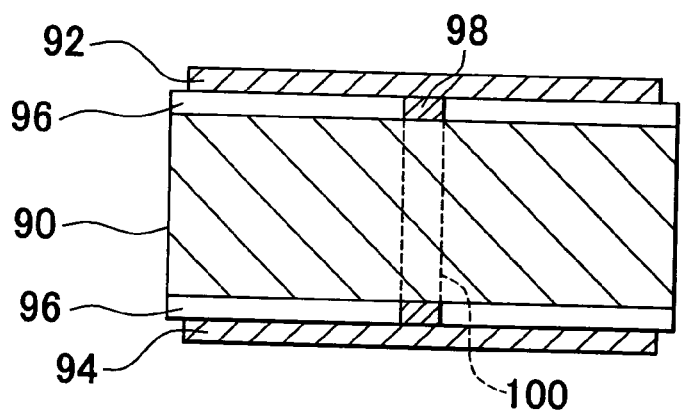
F I G. 27B
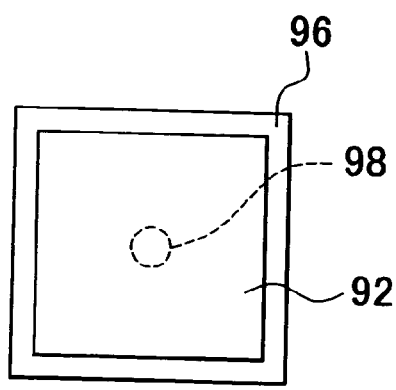

F I G. 28A
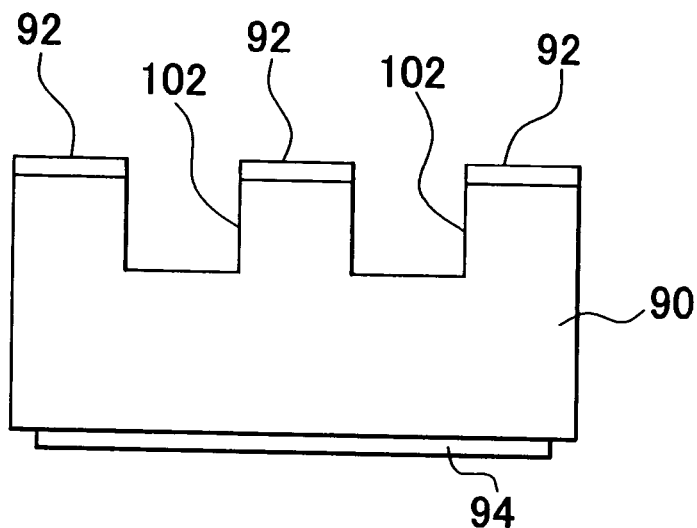
F I G. 28B
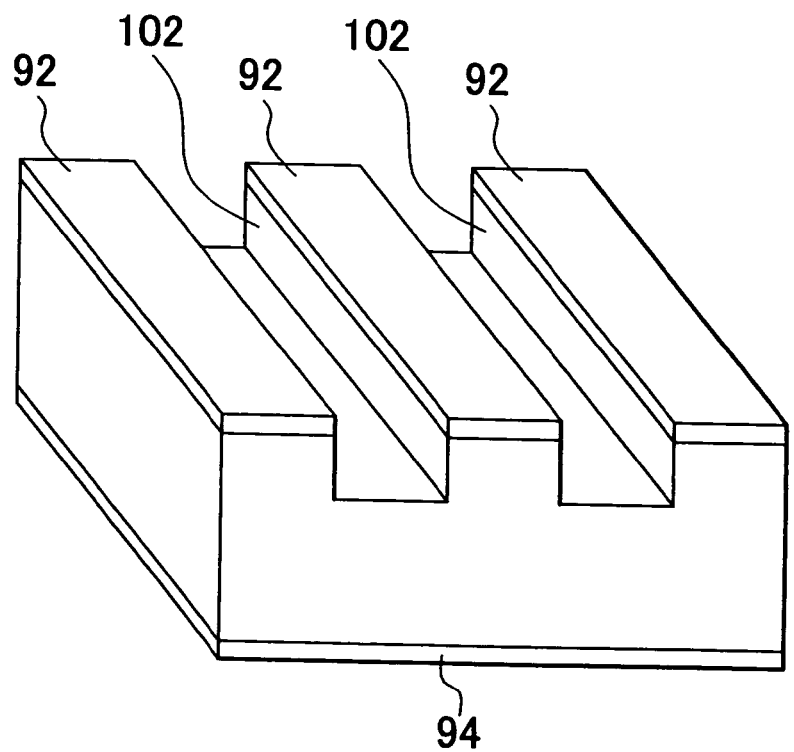

FORCE SENSING ELEMENT

INCORPORATION BY REFERENCE

The disclosures of Japanese Patent Applications No. 2002-277628 filed on Sep. 24, 2002 and No. 2002-297126 filed on Oct. 10, 2002, including the specification, drawings, and abstract are incorporated herein by reference in their entirety.

BACKGROUND OF THE INVENTION

1. Field of the Invention

The invention relates to a force sensing element and, more particularly, to a force sensing element that detects a load or the like by making use of a piezoresistance effect of a semiconductor for converting a compressive force into an electric signal.

2. Description of the Related Art

Heretofore, as a force sensing element used to detect a combustion pressure in a cylinder of an engine or the like, a compact force sensing element employing a piezoresistance element has been known. If a strain (deformation under stress) occurs in a certain portion of the piezoresistance element, the portion changes in resistivity in accordance with a magnitude of the strain. This piezoresistance element is generally constructed of a gauge resistance that is formed on a main face of a single-crystal Si substrate by means of a semiconductor manufacturing technique.

One known strain gauge employing a piezoresistance element is constructed as follows. An electrode is formed on a lateral face of the strain gauge or on another face thereof, which faces a stress-working face thereof. An expandable object to be measured is stuck on the stress-working face. A stress is detected from a current that changes in accordance with expansion of the object to be measured. In this strain gauge, since a stress is applied in the same direction as a current flows, a piezoresistance coefficient $\pi_{11}$ is utilized.

Further, one known force sensing element is constructed as follows. A Wheatstone bridge is constituted by forming four gauge resistances demonstrating a piezoresistance effect on an Si substrate whose (110)-face serves as a main face in such a manner as to extend in <100>- and <110>-directions. A force transmission block is disposed on this Wheatstone bridge to construct a force sensing element (which is disclosed, for example, in Japanese Patent Application Laid-Open No. 8-271363). In this force sensing element, if a force is applied to the force transmission block, a stress is transmitted from the force transmission block to a thickness direction of the Si substrate. Therefore, a voltage is applied such that a current flows perpendicularly to the direction in which the stress is transmitted. The gauge resistance produces a piezoresistance effect in accordance with the stress. Because the piezoresistance effect in the <100>-direction is different from the piezoresistance effect in the <110>-direction, there is created a difference between resistance values. By detecting the difference between the resistance values as a difference in voltage, a force transmitted to the force transmission block is detected.

In this force sensing element, a voltage is detected in the same direction as a current path extends, and a force (a uniaxial stress) is applied perpendicularly to the current path. Therefore, a piezoresistance coefficient $\pi_{13}$ is utilized.

In the case where this force sensing element is used as a combustion pressure sensor, the force sensing element is disposed at the center of a sensor housing and packed, and electrodes of the force sensing element are respectively connected to fetch terminals through wire bonding. The fetch terminals are formed coplanar with the electrodes respectively. A force transmission rod and a diaphragm are provided in an upper portion of the force sensing element in such a manner as to contact the force transmission block thereof. A force applied to the diaphragm is transmitted to the force sensing element via the force transmission rod. Thus, as described above, a combustion pressure is detected from a difference in voltage.

The force transmission block disposed on the piezoresistance element is composed of a high-rigidity rectangular parallelepiped force transmission body and a semispherical force transmission body disposed on the rectangular parallelepiped force transmission body, in consideration of characteristics of force transmission to the piezoresistance element (e.g., disclosed in Japanese Patent Application Laid-Open No. 2001-305001). In this force transmission block, the semispherical force transmission body converts a concentrated load applied to an upper semispherical portion thereof into a uniformly distributed load in a lower face thereof. This load presses and deforms the gauge portion of the piezoresistance element via the rectangular parallelepiped force transmission body.

However, the strain gauge of the aforementioned related art requires sticking the gauge on an object to be measured by means of an adhesive or the like. Therefore, dispersion of thickness, location, or the like of the adhesive causes a problem in that measurement results cannot be obtained with high precision. Also, at a high temperature above 400° C., the adhesive does not function sufficiently and makes the implementation of measurement impossible.

In the force sensing element of the related art, since the electrodes are formed on the same plane, wiring for outputting a gauge voltage needs to be created through wire bonding. This causes a problem of an increase in the number of manufacturing processes and a problem of difficulty in manufacturing the force sensing element at a low cost.

SUMMARY OF THE INVENTION

In consideration of the problems stated above, the invention provides force sensing elements described below. These force sensing elements can measure a force with high precision.

According to an embodiment as one example of the invention, there is provided a force sensing element comprising a gauge portion and a plurality of electrodes. The gauge portion is formed of an n-type semiconductor substrate whose (100)-face serves as a main face, a p-type semiconductor substrate whose (110)-face serves as a main face, or a p-type semiconductor substrate whose (111)-face serves as a main face, and is pressed in a thickness direction of the semiconductor substrate upon receiving a force. The electrodes are electrically connected to the gauge portion such that a current path extending in a direction corresponding to the thickness direction of the semiconductor substrate is formed in the gauge portion.

A piezoresistance coefficient $\pi_{11}$ exhibits a maximum sensitivity in a <100>-direction in the case of an n-type silicon single crystal whose (100)-face serves as a main face, in a <110>-direction in the case of a p-type silicon single crystal whose (110)-face serves as a main face, and in a <111>-direction in the case of a p-type silicon single crystal whose (111)-face serves as a main face. In the first invention, therefore, the gauge portion is formed of one of these semiconductor substrates in such a manner as to be pressed in the thickness direction thereof upon receiving a force.

Further, with a view to detecting a force by making use of the piezoresistance coefficient $\pi_{11}$, the electrodes are electrically connected to the gauge portion such that the current path extending in the direction corresponding to the thickness direction of the semiconductor substrate is formed in the gauge portion.

According to the force sensing element constructed as described above, the gauge portion is pressed in the thickness direction upon receiving a force. Therefore, unlike the case of a strain gauge, the force sensing element can detect a force without being stuck on an object to be measured.

Further, according to another aspect of the invention, there is provided a force sensing element comprising a semiconductor substrate, a gauge portion, and a plurality of electrodes. The gauge portion is formed on one main face of the semiconductor substrate, and is pressed upon receiving a force. The electrodes are electrically connected to the gauge portion such that a current path extending in a direction corresponding to a thickness direction of the semiconductor substrate is formed in the gauge portion. In this force sensing element, a force is applied along the current path in the gauge portion.

In the force sensing element constructed as described above, the electrodes are formed such that the current path extending in the direction corresponding to the thickness direction of the semiconductor substrate is formed in the gauge portion. The gauge portion is pressed along the current path upon receiving a force.

According to the force sensing element constructed as described above, the current path extends in the same direction as a voltage is detected, and a force (a uniaxial stress) is applied along the current path. Therefore, the piezoresistance coefficient $\pi_{11}$ is utilized.

According to the force sensing element constructed as described above, it is possible to adopt a construction which dispenses with anode junction and in which a force transmission block for pressing the gauge portion is used (a non-junction-type force sensing element). This non-junction-type force sensing element can be so constructed as to comprise a semiconductor substrate, a gauge portion, a plurality of electrodes, and a force transmission block. The gauge portion is formed on one main face of the semiconductor substrate, and is pressed upon receiving a force. The electrodes are electrically connected to the gauge portion such that a current path extending in a direction corresponding to a thickness direction of the semiconductor substrate is formed in the gauge portion. The force transmission block presses the gauge portion along the current path upon receiving a force.

In this non-junction-type force sensing element, since the force transmission block presses the gauge portion along the current path, the piezoresistance coefficient $\pi_{11}$ is utilized as described above. In addition, the non-junction-type force sensing element does not require a junction technology such as anode junction and thus can be manufactured at a low cost.

Further, the force sensing element constructed as described above can also be constructed by joining two semiconductor substrates together through a direct bonding method or the like, without using a force transmission block (a junction-type force sensing element). This junction-type force sensing element can be so constructed as to comprise a first semiconductor substrate, a gauge portion, a second semiconductor substrate, and a plurality of electrodes. The gauge portion is formed on one main face of the first semiconductor substrate, and is pressed upon receiving a force. The second semiconductor substrate is joined on the side of one main face thereof to the gauge portion of the first semiconductor substrate. The electrodes include a first electrode formed on the first semiconductor substrate and a second electrode formed on the second semiconductor substrate. A current path, which extends in the same direction as a force is applied to the gauge portion, is formed of the electrodes.

Using a first semiconductor substrate having a first gauge portion formed on one main face thereof and having a first electrode formed on the other main face thereof, and a second semiconductor substrate having a second gauge portion formed on one main face thereof at a position corresponding to the first gauge position and having a second electrode formed on the other main face thereof, the junction-type force sensing element can be constructed by joining the first and second gauge portions together. Alternatively, using a first semiconductor substrate having a first gauge portion formed on one main face thereof and having a first electrode formed on the other main face thereof, and a second semiconductor substrate having a second electrode formed on one main face thereof and having a leader line electrically connected to the second electrode formed on the other main face thereof, the junction-type force sensing element can also be constructed by joining the gauge portion of the first electrode to the side of one main face of the second electrode and joining the gauge portion to the leader line.

In this junction-type force sensing element as well, if the gauge portion receives a force, this force is applied along the current path, which extends in the same direction as a voltage is detected. Therefore, the piezoresistance coefficient $\pi_{11}$ is utilized as described above. In the junction-type force sensing element, since junction of the gauge portion is held secure, no slipping occurs in the gauge portion. As a result, no hysteresis is caused.

As described above, the piezoresistance coefficient $\pi_{11}$ exhibits a maximum sensitivity in a <110>-direction in the case of a p-type silicon single crystal whose (110)-face serves as a main face, in a <111>-direction in the case of a p-type silicon single crystal whose (111)-face serves as a main face, and in a <100>-direction in the case of an n-type silicon single crystal whose (100)-face serves as a main face.

According to another aspect of the invention, there is provided a force sensing element comprising a semiconductor substrate, a gauge portion, a plurality of electrodes, and a force transmission block. The gauge portion is formed on one main face of the semiconductor substrate, and is pressed upon receiving a force. The electrodes are electrically connected to the gauge portion such that a current path extending in a direction corresponding to a thickness direction of the semiconductor substrate is formed in the gauge portion. The force transmission block presses the gauge portion along the current path upon receiving a force.

According to the force sensing element constructed as described above, the force transmission block presses the gauge portion along the current path. Thus, unlike the case of a strain gauge, the force sensing element can detect a force without being stuck on an object to be measured.

BRIEF DESCRIPTION OF THE DRAWINGS

The above-mentioned and other objects, features, advantages, technical and industrial significance of this invention will be better understood by reading the following detailed description of preferred embodiments of the invention, when considered in connection with the accompanying drawings, in which:

FIG. 11 is a cross-sectional view of the junction-type force sensing element of the third embodiment;

FIG. 12 is a cross-sectional view of a junction-type force sensing element that is vertically inversed in accordance with a modification example of the third embodiment;

FIG. 26 is a cross-sectional view of a sensing element portion of a force sensing element in accordance with a fourteenth embodiment of the invention;

FIG. 27A is a cross-sectional view of a sensing element portion of a force sensing element in accordance with a fifteenth embodiment of the invention;

FIG. 27B is a plan view of the sensing element portion of the force sensing element in accordance with the fifteenth embodiment of the invention;

FIG. 28A is a cross-sectional view of a sensing element portion of a force sensing element in accordance with a sixteenth embodiment of the invention;

FIG. 28B is a plan view of the sensing element portion of the force sensing element in accordance with the sixteenth embodiment of the invention;

DESCRIPTION OF THE EXEMPLARY EMBODIMENTS

In the following description and the accompanying drawings, the invention will be described in more detail with reference to exemplary embodiments thereof.

Hereinafter, detailed description will be given with reference to the drawings, as to cases where force sensing elements of the embodiments of the invention are applied to a combustion pressure sensor.

Figure 1:
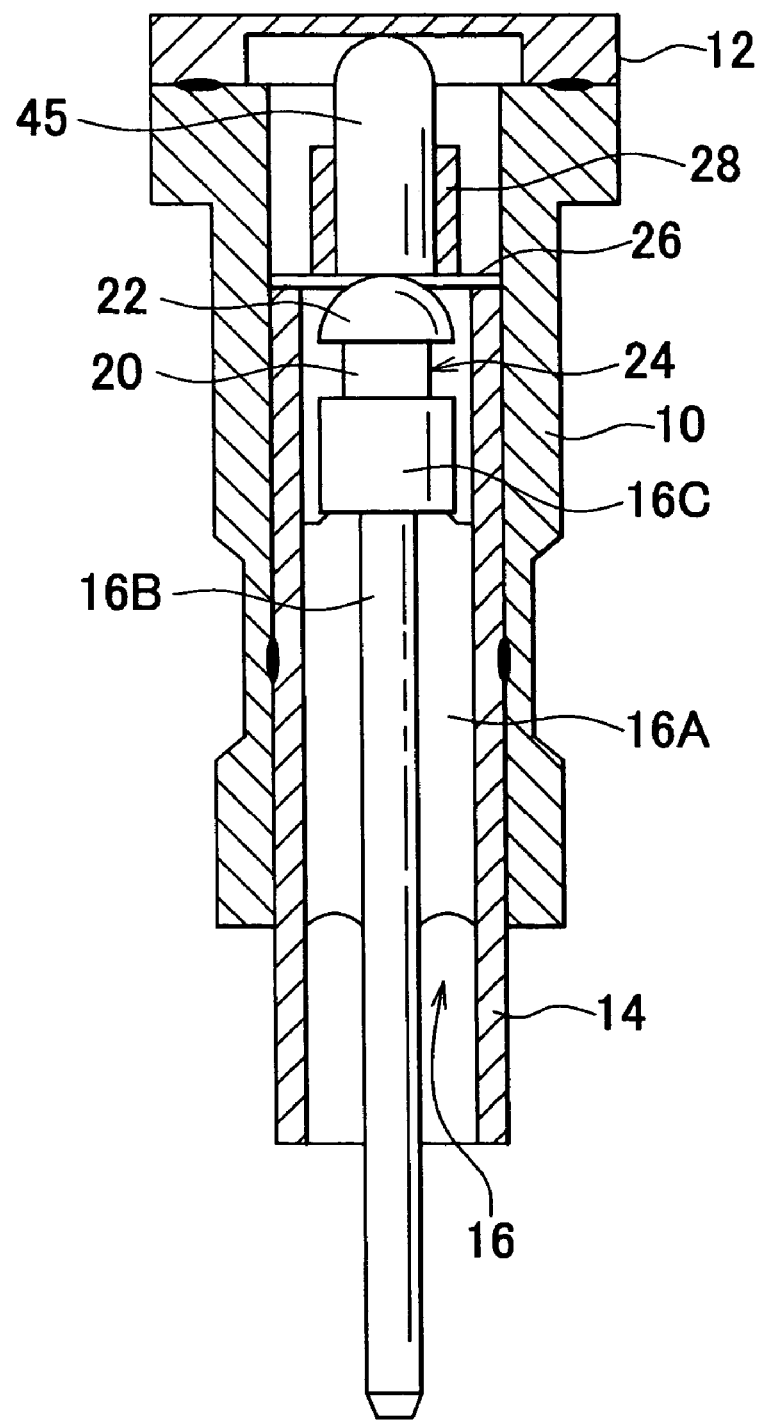
FIG. 1 is a cross-sectional view of a combustion pressure sensor in which a force sensing element in accordance with an embodiment of the invention is installed.

As shown in FIG. 1, a metal diaphragm 12 is fixed to one end of a tubular housing 10 through resistance welding. A tubular terminal 14 is partially inserted into the housing 10, and is fixed to an inner wall of the housing 10 through resistance welding.

A hermetic terminal 16 is inserted into the tubular terminal 14, whereby the inside of the housing 10 is airtightly sealed. The hermetic terminal 16 is composed of an insulator 16A and a stick-like terminal 16B. The insulator 16A is airtightly sealed in the tubular terminal 14. The stick-like terminal 16B penetrates the insulator 16A. One end of the stick-like terminal 16B protrudes outside the insulator 16A. An element fixation portion 16C having a large diameter is formed at the other end of the stick-like terminal 16B. The element fixation portion 16C of the stick-like terminal 16B is disposed inside a chamber that is airtightly sealed.

Figure 2A:
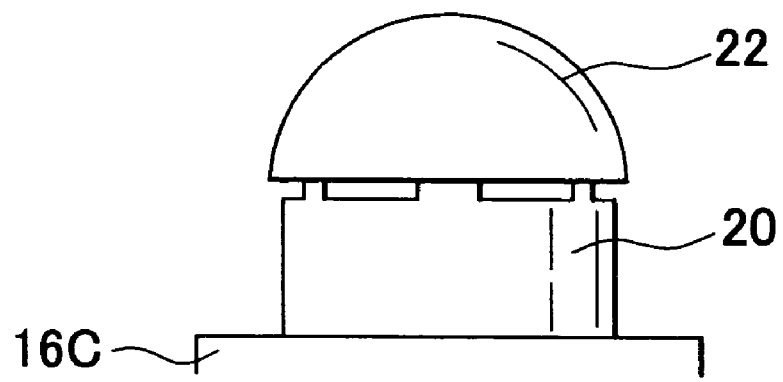
FIG. 2A is an enlarged view of the force sensing element illustrated in FIG. 1.

A sensing element portion 20 of a force sensing element 24 is fixed to the element fixation portion 16C of the stick-like terminal 16B on the side of an electrode which is located on the lower side. As shown in FIG. 2A as well, the force sensing element 24 is composed of a sensing element portion 20 and a hemispherical force transmission body 22, which is laid on an upper face of the sensing element portion 20.

It is preferable that the force transmission body 22 be made of a material exhibiting a high electrical conductivity. If the force transmission body 22 is made of a material exhibiting no electrical conductivity or a material exhibiting a low electrical conductivity, it is appropriate that a surface of the force transmission body 22 be subjected to an electrical conductivity treatment such as an Ni electroless plating or the like so as to exhibit good electrical conductivity. A plate-like connection terminal 26, which electrically connects an end of the tubular terminal 14 and an apex of the force transmission body 22, is provided at the end of the tubular terminal 14 which is located inside the airtightly sealed chamber. A guide tube 28 is fixed to an upper face of the connection terminal 26. A rod 45 is inserted into the guide tube 28. The rod 45 is in contact with a reverse face of the diaphragm 12, and can axially move along the guide tube.

Next, the sensing element portion of the force sensing element will be described in detail. As this force sensing element, a non-junction-type force sensing element or a junction-type force sensing element is applicable.

Figure 3:
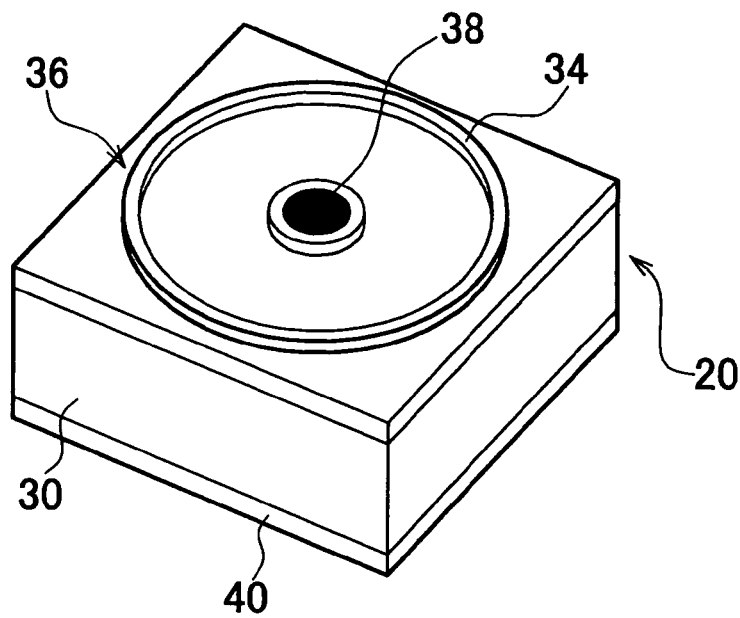
FIG. 3 is a perspective view of a sensing element portion of a non-junction-type force sensing element which is designed in accordance with a first embodiment and which can be used for a combustion pressure sensor.
Figure 4:
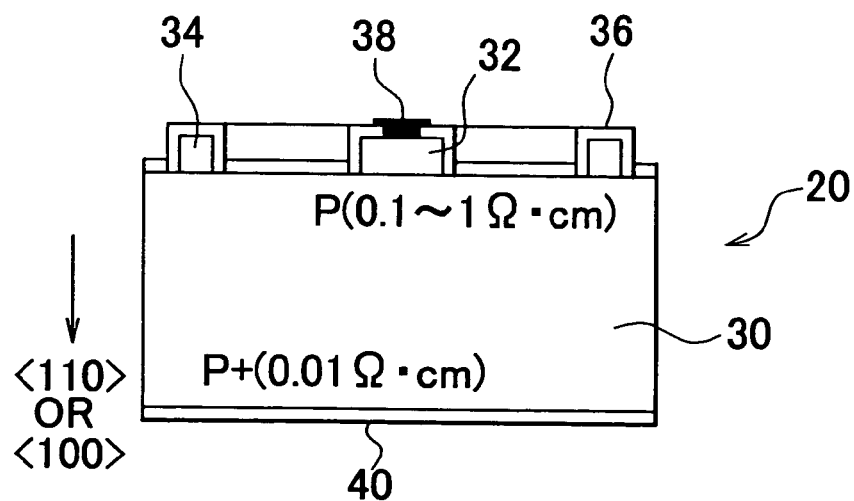
FIG. 4 is a cross-sectional view of the sensing element portion of the first embodiment in the case where a p-type silicon single-crystal substrate is used.

First of all, description will be given citing a non-junction-type force sensing element as the force sensing element of the first embodiment. A sensing element portion of this non-junction-type force sensing element is illustrated in FIGS. 3 and 4.

As a semiconductor substrate constituting the sensing element portion, a p-type semiconductor (e.g., silicon single crystal) substrate whose (110)-face serves as a main face, an n-type semiconductor (e.g., silicon single crystal) substrate whose (100)-face serves as a main face, or a p-type semiconductor (e.g., silicon single crystal) substrate whose (111)-face serves as a main face can be used. These substrates have an impurity concentration level of e.g. 0.01 Ω·cm or more so as to establish ohmic contact with an electrode formed on the main face.

Hereinafter, description will be given as to a case where a silicon single-crystal substrate is used as the semiconductor substrate. A columnar gauge portion 32 and a ring-like force transmission body support portion 34 are formed on one main face of the silicon single-crystal substrate. The ring-like force transmission body support portion 34 is provided in the periphery of the gauge portion 32 while stretching around it. A second electrode 40 is formed on the other main face of the silicon single-crystal substrate. A first electrode 38 is formed on the gauge portion 32 while facing the second electrode 40, such that current flows in a thickness direction of the silicon single-crystal substrate, namely, such that a current path is formed in the thickness direction of the silicon single-crystal substrate. The first electrode 38 is electrically connected to the gauge portion 32. The first and second electrodes of this embodiment constitute a pair of opposed electrodes. Incidentally, it is not important whether current flows through the current path in a direction from the first electrode to the second electrode or in a direction from the second electrode to the first electrode.

This sensing element portion is manufactured as follows. First of all, an epitaxial layer having a resistance value of e.g. 0.1 Ω·cm to 1 Ω·cm and a thickness of e.g. 1 μm to 3 μm is grown on a silicon single-crystal substrate through epitaxial growth.

Then, an unused region of the epitaxial layer is removed by etching such that the columnar gauge portion 32 is formed at the center of one main face and that the ring-like force transmission body support portion 34 stretching around the columnar gauge portion 32 is formed, as is apparent from FIGS. 3 and 4. The force transmission body support portion 34 has a ring-like shape and thus is formed completely symmetrically (point-symmetrically) with respect to the columnar gauge portion 32. Thereafter, an $SiO_2$ membrane 36 is formed on an entire upper face of the silicon single-crystal substrate. Because the epitaxial layer has a thickness of 1 μm to 3 μm, the columnar gauge portion 32 and the ring-like force transmission body support portion 34 have a height of about 1 μm to 3 μm.

A contact hole is formed in an S102 membrane through wet etching. The S102 membrane is formed on an upper face of the columnar gauge portion 32. The first electrode 38, which is in ohmic contact with the gauge portion 32 via the contact hole, is formed through Al sputtering and reactive ion etching.

The second electrode 40 is formed on an entire lower face of the silicon single-crystal substrate.

Figure 5:
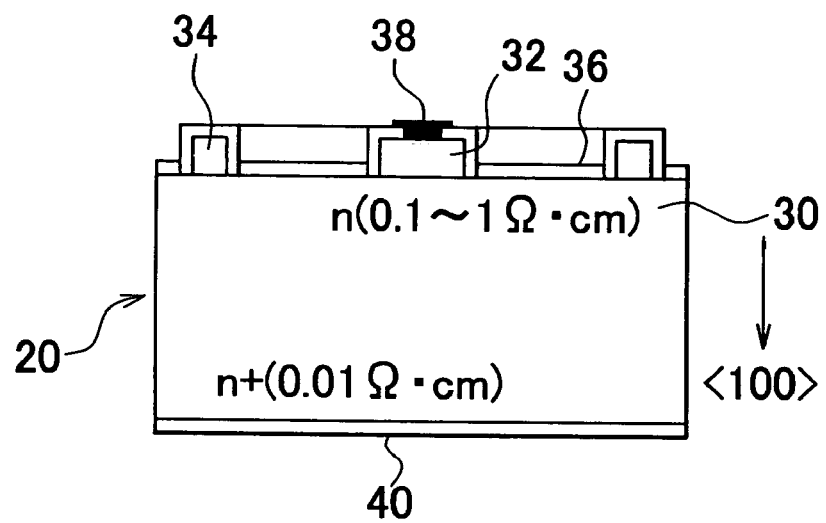
FIG. 5 is a cross-sectional view of the sensing element portion of the first embodiment in the case where an n-type silicon single-crystal substrate is used.

Thus, the first electrode 38 and the second electrode 40 are formed facing each other. When a voltage is applied between the first electrode 38 and the second electrode 40, a current path through which current flows from the first electrode 38 to the second electrode 40 or from the second electrode 40 to the first electrode 38 is formed. This current path is oriented in the thickness direction of the silicon single-crystal substrate. For instance, in the case of a p-type silicon single-crystal substrate with a current path through which current flows from the first electrode 38 to the second electrode 40, the current path is formed in a <110>-direction or a <111>-direction as illustrated in FIG. 4. In the case of an n-type silicon single-crystal substrate, the current path is formed in a <100>-direction as illustrated in FIG. 5.

As a material for the first and second electrodes, it is appropriate to use a material with which ohmic contact is established. For instance, it is possible to use the above-described Al or an Al alloy. From the standpoint of material strength, however, it is desirable to use one of W, Ni, Ti, Cr, and the like. It is preferable that outermost surfaces of the electrodes be coated with a relatively inoxidizable metal material such as Au.

The shape of the gauge portion 32 is determined by a resistance value suited for the gauge portion. The resistance value of the gauge portion is expressed by a formula shown below. For instance, therefore, if a gauge resistance (120 Ω to 1 kΩ) of a strain gauge that is employed for general purposes is used, a gauge resistance value of about 160 Ω is obtained, for example, under the assumption that the columnar gauge portion has a resistivity of 0.1 Ω·cm, that the gauge has a height of 3 μm, and that the columnar gauge portion has a diameter of 5 μm.

In the case where an epitaxial layer whose gauge portion exhibits a relatively high resistance (e.g., at the level of 1 Ω) is used, ohmic contact with the first electrode is unlikely to be established. In this case, therefore, it is appropriate that a shallow high-concentration layer be formed on the surface of the gauge portion, for example, through an ion implantation technology. By the same token, if ohmic contact with the second electrode is unlikely to be established, it is appropriate that the concentration of impurities on a contacting face between the second electrode and the substrate be enhanced.

Resistance value of the gauge portion=resistivity of the gauge portion (concentration of the epitaxial layer)×thickness of the gauge+surface area of the gauge portion.

It is to be noted herein that upper-limit and lower-limit values of diameter and height of the columnar gauge portion are determined by breaking strength and output sensitivity of the gauge portion under application of a pressure.

Although the ring-like force transmission body support portion has been described above, the force transmission body support portion to be disposed in the periphery of the gauge portion may assume any shape as long as no influence is exerted upon output sensitivity and breaking strength of the gauge. The shape of the force transmission body support portion is not limited in particular. The force transmission body support portion may be formed in a polygonal shape such as a quadrangle shape, a pentagon shape, or the like.

A load applied to the force transmission body 22 is transmitted to the upper electrode 38 and presses the gauge portion 32 along the current path. This pressing force is converted into a resistance change based on a piezoresistance effect resulting from a piezoresistance coefficient $\pi_{11}$ of the silicon single-crystal substrate. Accordingly, in the case of constant-current driving, the load applied to the force transmission body 22 can be precisely sensed from a change in voltage resulting from a change in resistance.

Figure 6:
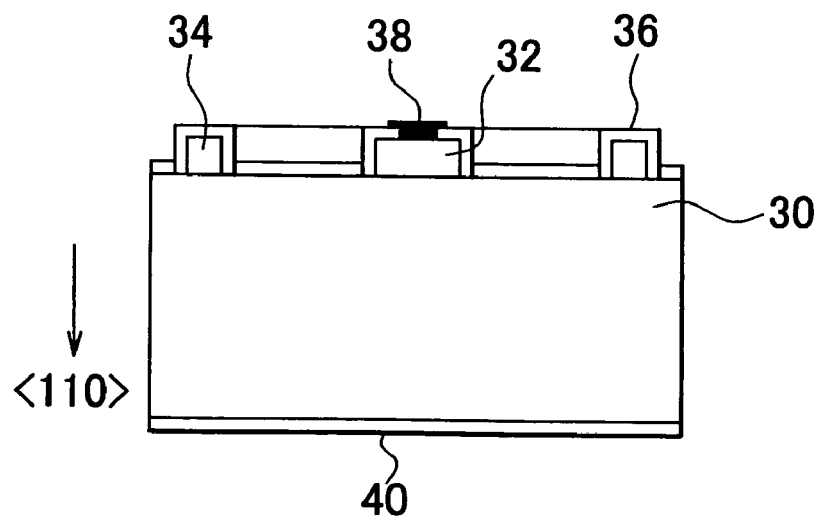
FIG. 6 is a cross-sectional view of a sensing element portion in accordance with a modification example of the first embodiment in the case where a p-type silicon single-crystal substrate is used.

The above description deals with an example in which a gauge portion is formed on a region subjected to epitaxial growth. As a modification example of the first embodiment, however, as illustrated in FIG. 6, it is also appropriate that a silicon single-crystal substrate that has not been subjected to epitaxial growth be skived by means of dice cutting or the like so as to form the gauge portion 32 and the support portion 34. In this case, the gauge portion is formed of the silicon single-crystal substrate itself.

Next, the second embodiment will be described. A force sensing element of the second embodiment is also a non-junction-type force sensing element. A sensing element portion of this force sensing element will be described with reference to FIGS. 7 to 9. In the second embodiment, the ring-like force transmission body support portion is replaced with a plurality of columnar force transmission body support portions, which are equidistantly arranged along the circumference of a circle. Therefore, referring to FIGS. 7 to 9, component members corresponding to those illustrated in FIGS. 3 to 5 are denoted by the same reference numerals and will not be described below.

Figure 7:
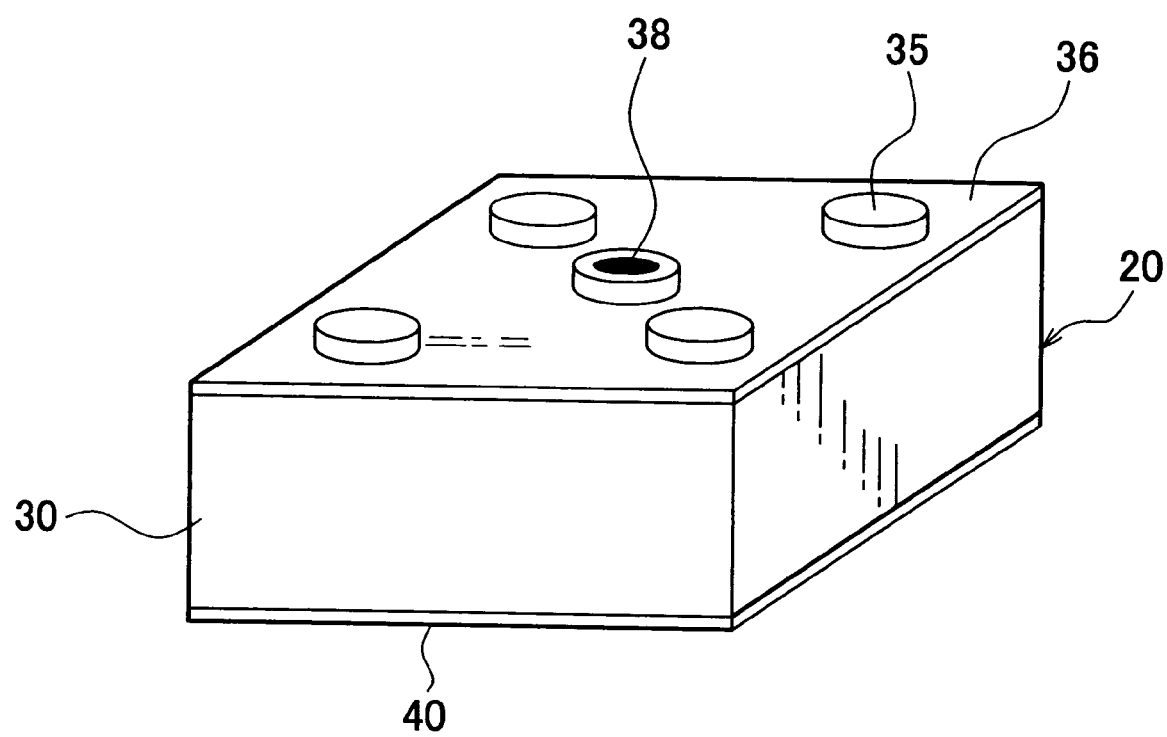
FIG. 7 is a perspective view of a sensing element portion of a force sensing element in accordance with a second embodiment of the invention.
Figure 8:
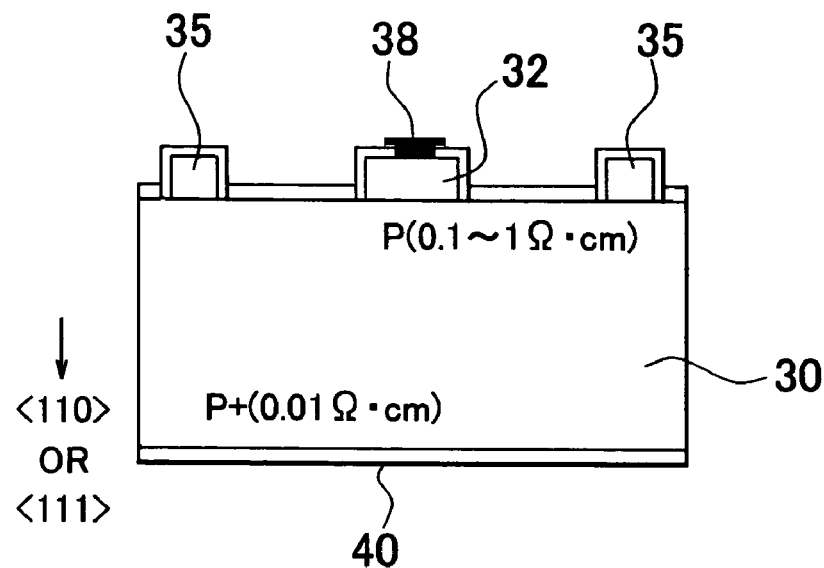
FIG. 8 is a cross-sectional view of the sensing element portion of the second embodiment in the case where a p-type silicon single-crystal substrate is used.

In the second embodiment, as is apparent from FIGS. 7 and 8, an unused region of an epitaxial layer is removed by etching such that a plurality of (e.g., four) columnar force transmission body support portions 35 are equidistantly formed along the circumference of a circle stretching around the columnar gauge portion 32 that is formed at the center of one main face. As is the case with the columnar gauge portion 32, the force transmission body support portions 35 have a height of about 1 μm to 3 μm. The force transmission body support portions 35 are point-symmetrically arranged with respect to the gauge portion.

Figure 9:
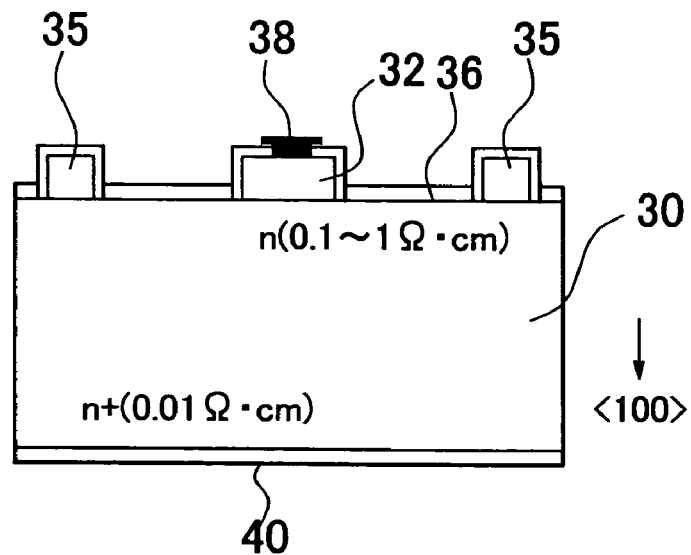
FIG. 9 is a cross-sectional view of the sensing element portion of the second embodiment in the case where an n-type silicon single-crystal substrate is used.

Incidentally, FIG. 8 illustrates an example in which a current path is formed in the <110>-direction or the <111>-direction using a p-type silicon single-crystal substrate. FIG. 9 illustrates an example in which a current path is formed in the <100>-direction using an n-type silicon single-crystal substrate. Positions where the force transmission body support portions are located and shapes of the force transmission body support portions are not limited in particular, and may be arbitrarily determined as long as no influence is exerted upon output sensitivity and breaking strength of the gauge. In the second embodiment as well, it is not important whether current flows through the current path in the direction from the first electrode to the second electrode or in the direction from the second electrode to the first electrode.

In general, a semiconductor circuit is formed on a (100)-face or a crystal face equivalent thereto. Therefore, if an n-type silicon single-crystal (100)-substrate is used in the first and second embodiments, an amplifier and a drive circuit can be easily combined with a semiconductor load sensor. Thus, a sensor integrated with a control circuit, which was hardly conceivable in the past, can now be realized.

In the second embodiment as well, as described in the modification example (FIG. 6) of the first embodiment, it is appropriate that a silicon single-crystal substrate that has not been subjected to epitaxial growth be skived by means of dice cutting so as to form the gauge portion and the support portion. In this case as well, the gauge portion is formed of the silicon single-crystal substrate itself.

Figure 2B:
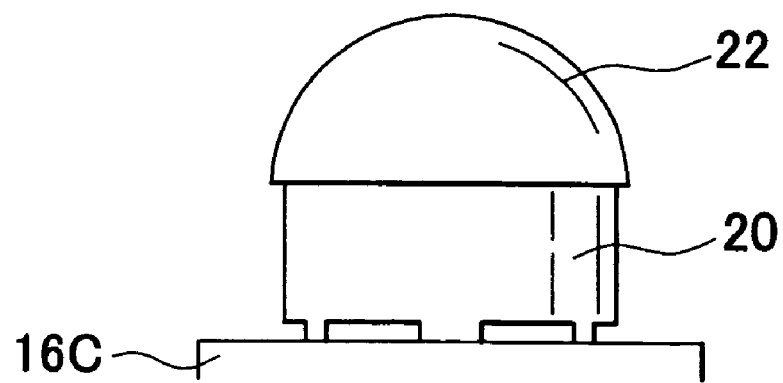
FIG. 2B is an enlarged view of the force sensing element in the case where a sensing element portion illustrated in FIG. 2A is used in a vertically inversed state.

The above description deals with an example in which the force transmission body 22 is disposed on the side where the gauge portion 32 is formed. As illustrated in FIG. 2B, however, it is also appropriate that the sensing element portion be vertically inverted and that the force transmission body 22 be disposed on the side of the second electrode. In this case as well, it is not important whether current flows through the current path in the direction from the first electrode to the second electrode or in the direction from the second electrode to the first electrode.

Figure 10:
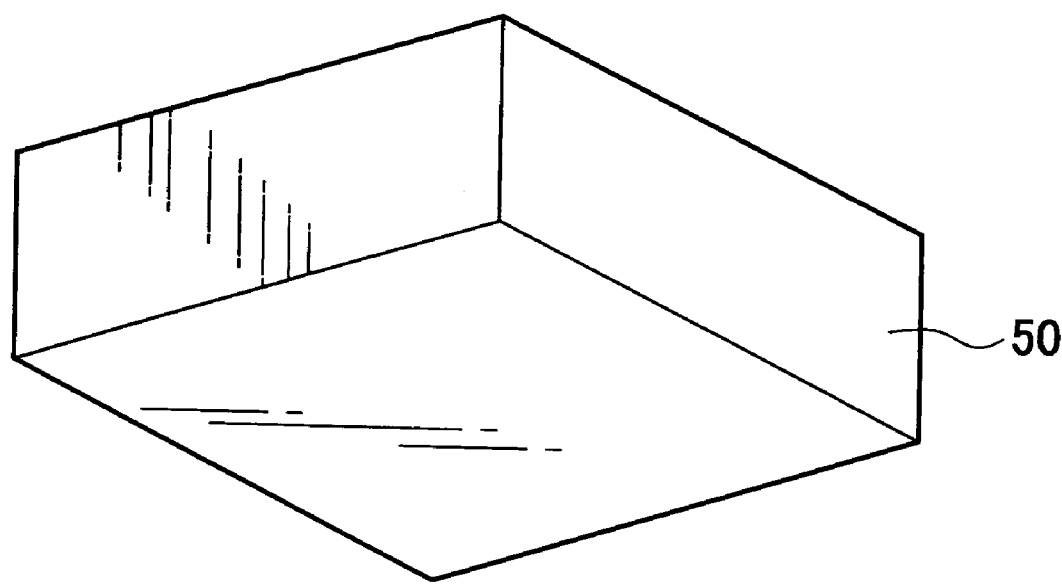
FIG. 10 is a perspective view of a semiconductor substrate of a junction-type force sensing element as a force sensing element in accordance with a third embodiment of the invention in which a gaugeless substrate and a gauge-including substrate that can be used for a combustion pressure sensor are used.
Figure 10:
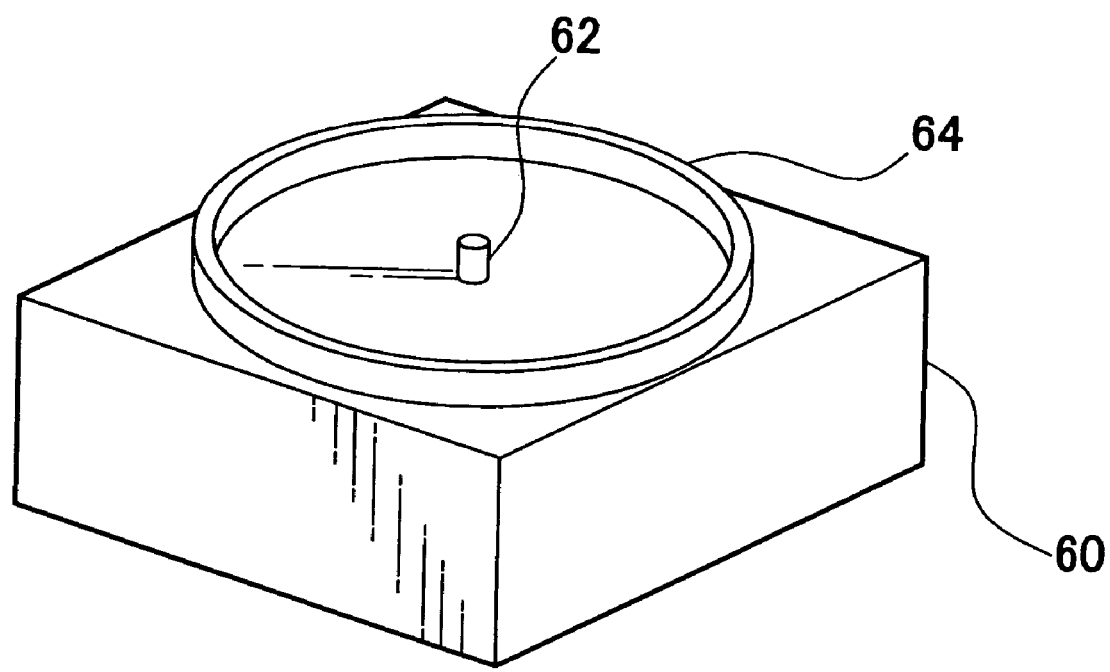

Next, a force sensing element of the third embodiment will be described. The sensing element of the third embodiment is a junction-type force sensing element. A sensing element portion of the junction-type force sensing element is illustrated in FIGS. 10 and 11. This sensing element portion is provided with a first silicon single-crystal substrate 50 as a first semiconductor substrate and a second silicon single-crystal substrate 60 as a second semiconductor substrate.

A first electrode 56 is formed on one main face of the first silicon single-crystal substrate 50 in such a manner as to cover the entirety of the main face. It is to be noted herein that the first silicon single-crystal substrate 50 is provided with no gauge portion.

A columnar gauge portion 62 and a ring-like gauge portion 64 stretching around the gauge portion 62 are formed at the center of one main face of the second silicon single-crystal substrate 60. As described above, these gauge portions can be formed through epitaxial growth and etching. Further, a second electrode 66 is formed on the other main face of the second silicon single-crystal substrate 60 in such a manner as to cover the entirety of the main face. As a material for the first electrode and the second electrode, the materials mentioned in the foregoing description can be used.

Unlike the case of a silicon single-crystal substrate of a non-junction-type force sensing element, no $SiO_2$ membrane is formed on the side of the other main face of the first silicon single-crystal substrate or on the second silicon single-crystal substrate on the side where the gauge portion is formed. Therefore, the columnar gauge portion and the ring-like gauge portion are formed of Si single crystal.

The first silicon single-crystal substrate 50 and the second silicon single-crystal substrate 60 are joined together by a direct bonding method in which gauge portions of Si single crystal are heated, pressurized, and joined while being held in contact with each other. Thus, the sensing element portion illustrated in FIG. 11 is constructed.

If a voltage is applied to the sensing element portion between the first electrode and the second electrode, a current path is formed in the gauge portion in a central region of the joined silicon single-crystal substrates and in the gauge portion in a peripheral region of the joined silicon single-crystal substrates, as is apparent from FIG. 11. Along the current path, current flows through the gauge portions in a thickness direction of the substrates. In FIG. 11, a voltage is applied such that current flows through the current path in the direction from the first electrode to the second electrode. However, it is also appropriate to apply a voltage such that current flows through the current path in the direction from the second electrode to the first electrode.

FIG. 11 illustrates an example in which a silicon single-crystal substrate where no gauge portion is formed is disposed on a silicon single-crystal substrate where a gauge portion is formed. As illustrated in FIG. 12, however, it is also appropriate that a silicon single-crystal substrate where a gauge portion is formed be disposed on a silicon single-crystal substrate on which no gauge portion is formed. In this case as well, it is not important whether current flows through the current path in the direction from the first electrode to the second electrode or in the direction from the second electrode to the first electrode.

As described above, a p-type silicon single-crystal substrate whose (110)-face or (111)-face serves as a main face or an n-type silicon single-crystal substrate whose (100)-face serves as a main face can be used as a semiconductor substrate.

According to the sensing element portion of the junction-type force sensing element of the third embodiment, the gauge portion is formed only on one of the pair of the silicon single-crystal substrates, and nothing is formed on the main face of the other silicon single-crystal substrate that faces the gauge portion. Therefore, when joining a pair of silicon single-crystal substrates together by means of a direct bonding method, they can be positioned easily.

Figure 13:
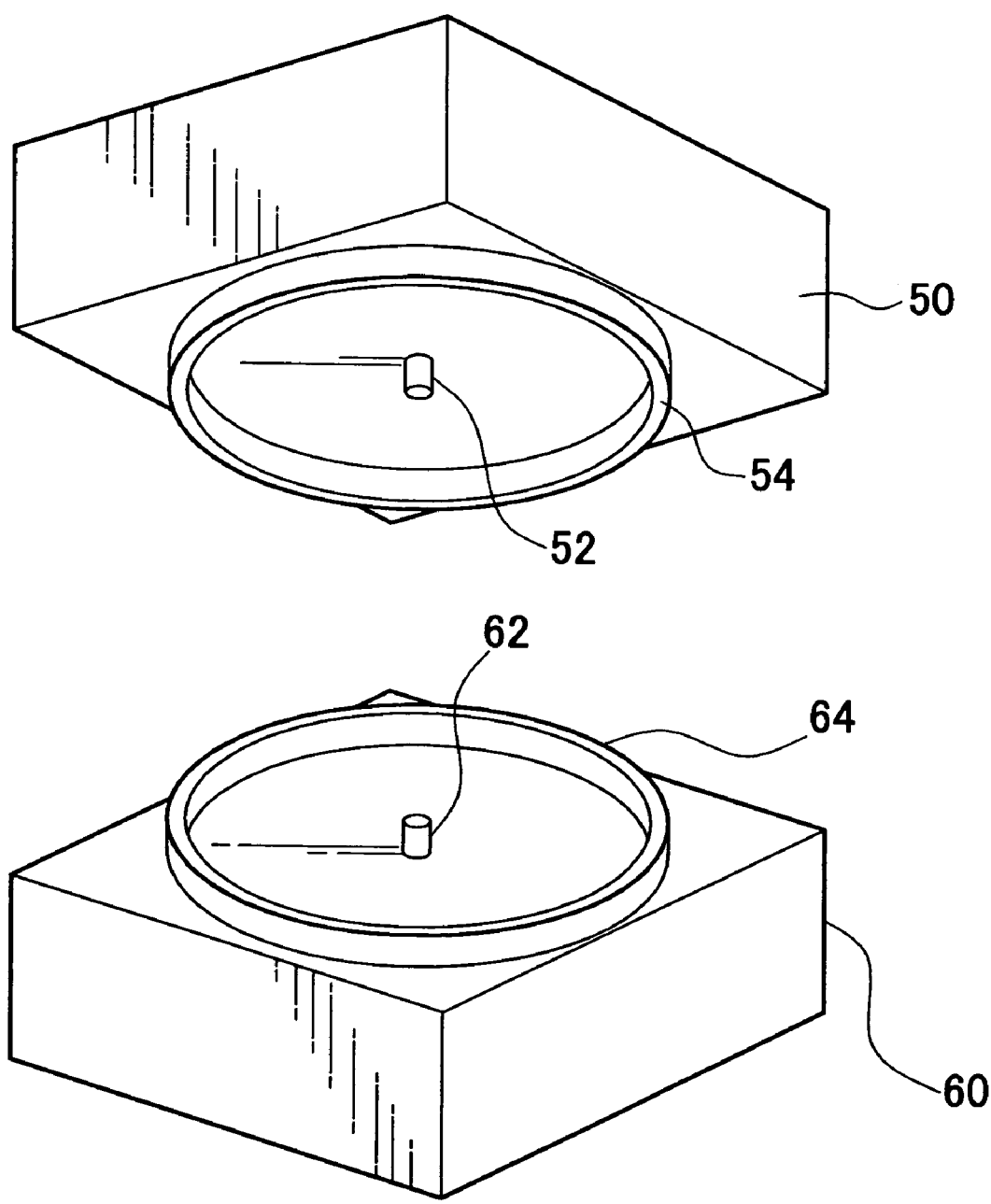
FIG. 13 is a perspective view of a semiconductor substrate of a junction-type force sensing element as a force sensing element in accordance with a fourth embodiment of the invention in which a pair of gauge-including substrates that can be used for a combustion pressure sensor are used.
Figure 14:
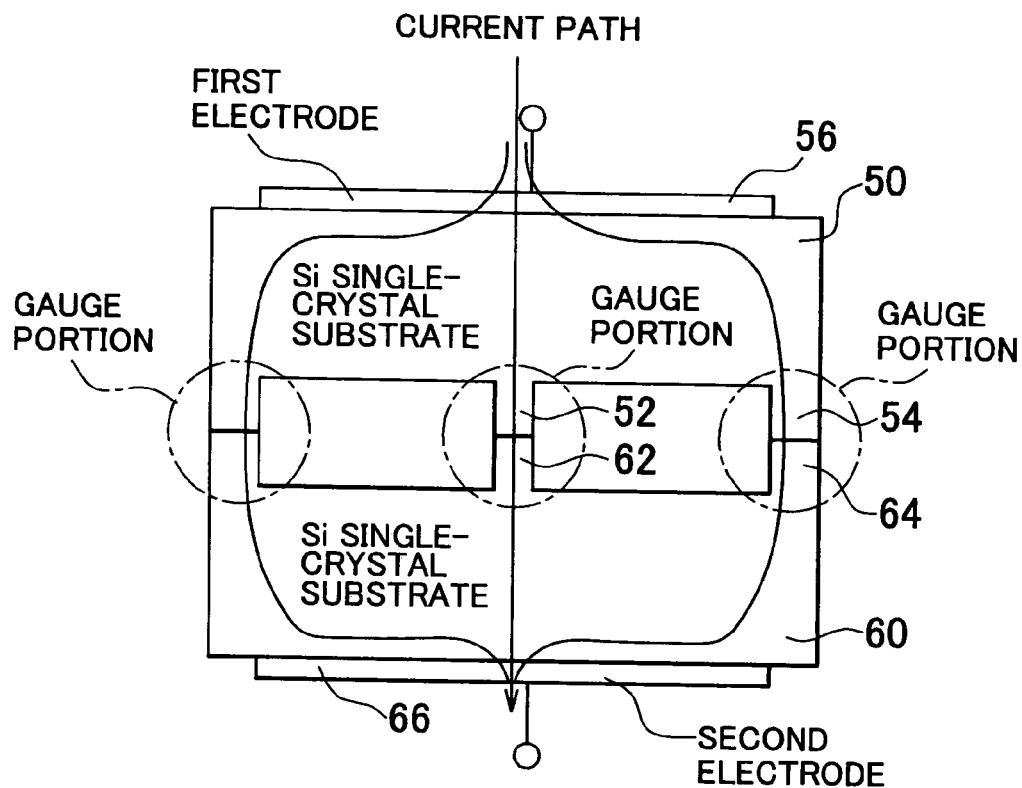
FIG. 14 is a cross-sectional view of the junction-type force sensing element of the fourth embodiment.

Next, a force sensing element (junction type) of the fourth embodiment will be described. A sensing element portion of the junction-type force sensing element of the fourth embodiment is illustrated in FIGS. 13 and 14. In this sensing element portion, both a columnar gauge portion and a ring-like gauge portion are provided on each of the first silicon single-crystal substrate 50 as the first semiconductor substrate and the second silicon single-crystal substrate 60 as the second semiconductor substrate.

As illustrated in FIG. 14, a columnar gauge portion 52 is formed at the center of one main face of the first silicon single-crystal substrate 50, and a ring-like gauge portion 54 is formed stretching around the gauge portion 52. As described above, these gauge portions can be formed through epitaxial growth and etching. The first electrode 56 is formed on the other main face of the first semiconductor substrate 50 in such a manner as to cover the entirety of the main face.

The columnar gauge portion 62 is formed at the center of one main face of the second silicon single-crystal substrate 60, and the ring-like gauge portion 64 is formed stretching around the gauge portion 62. The second electrode 66 is formed on the other main face of the second silicon single-crystal substrate 60 in such a manner as to cover the entirety of the main face. As a material for the first and second electrodes, the materials mentioned in the foregoing description can be used. As for the material for the first and second electrodes, the same holds true for the embodiments and modification examples to be described below.

As described above, unlike the case of a silicon single-crystal substrate of a non-junction-type force sensing element, no $SiO_2$ membrane is formed on the first or second silicon single-crystal substrate on the side where the gauge portion is formed. Therefore, the columnar gauge portion and the ring-like gauge portion are formed of Si single crystal.

The first silicon single-crystal substrate 50 and the second silicon single-crystal substrate 60 are joined together by a direct bonding method in which gauge portions of Si single crystal are heated, pressurized, and joined while being held in contact with each other. Thus, the sensing element portion illustrated in FIG. 14 is constructed.

If a voltage is applied to the sensing element portion between the first electrode and the second electrode, a current path is formed in the gauge portion in a central region of the joined silicon single-crystal substrates and in the gauge portion in a peripheral region of the joined silicon single-crystal substrates, as is apparent from FIG. 14. Along the current path, current flows through the gauge portions in a thickness direction of the substrates. In FIG. 14, a voltage is applied such that current flows through the current path in the direction from the first electrode to the second electrode. However, it is also appropriate to apply a voltage such that current flows through the current path in the direction from the second electrode to the first electrode.

As described above, a p-type silicon single-crystal substrate whose (110)-face serves as a main face or an n-type silicon single-crystal substrate whose (100)-face serves as a main face can be used as a semiconductor substrate.

According to the sensing element portion of the junction-type force sensing element of the fourth embodiment, gauge portions are formed on a pair of silicon single-crystal substrates respectively, joined together, and connected in series. Therefore, the gauge portions are increased in resistance. This makes it possible to detect a force precisely.

Figure 15:
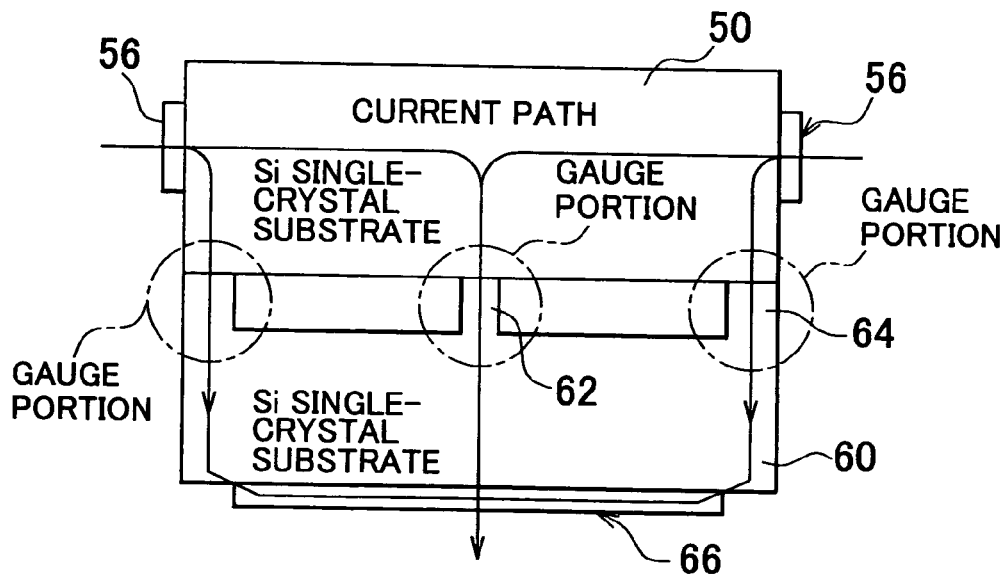
FIG. 15 is a cross-sectional view of a sensing element portion of a junction-type force sensing element in accordance with a fifth embodiment of the invention.
Figure 16:
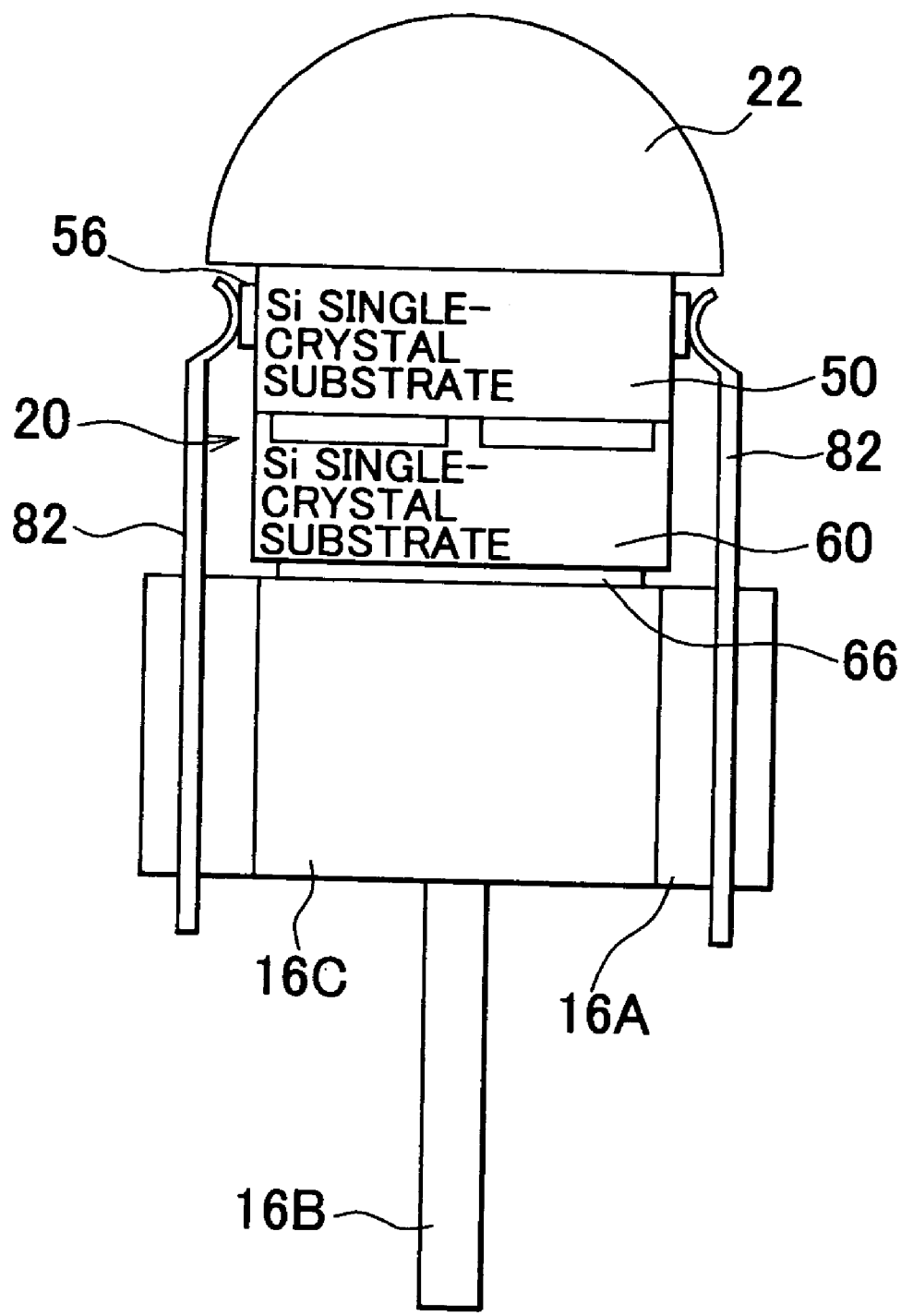
FIG. 16 is a cross-sectional view of a force sensing element on which the sensing element portion of the fifth embodiment is mounted.

Next, a force sensing element (junction type) of the fifth embodiment will be described. A sensing element portion of the junction-type force sensing element of the fifth embodiment is illustrated in FIGS. 15 and 16. In the sensing element portion of the fifth embodiment, one of the pair of the opposed electrodes described in the aforementioned embodiments is replaced with a lateral electrode formed on a lateral face of a silicon single-crystal substrate.

A pair of first electrodes (lateral electrodes) 56 are formed respectively on opposed lateral faces of the first silicon single-crystal substrate 50 that is disposed on the second silicon single-crystal substrate 60. Incidentally, it is also appropriate that the first electrode 56 be formed along the entire circumference of the first silicon single-crystal substrate 50. The second silicon single-crystal substrate 60 is identical in construction with the aforementioned one described with reference to FIG. 11. Therefore, component members corresponding to those illustrated in FIG. 11 are denoted by the same reference numerals and will not be described below.

As illustrated in FIG. 16, this sensing element portion is laid on the element fixation portion 16C, and the sensing element portion 20 of the force sensing element is fixed to the element fixation portion 16C on the side of the second electrode.

As is apparent from FIG. 16, the insulator 16A of the hermetic terminal is formed in such a manner as to cover an outer periphery of the element fixation portion 16C. A pair of peripheral terminals 82, which penetrate the stick-like terminal 16B provided in a central region of the insulator 16A in the longitudinal direction of the stick-like terminal 16B, are supported by the insulator 16A. Leading ends of the peripheral terminals 82 are bent in such directions as to approach each other.

A distance between the leading ends of the peripheral terminals 82 is made shorter than a dimension of the contour of the sensing element portion by bending the leading ends of the peripheral terminals 82. Thus, when the sensing element portion is laid on the element fixation portion 16C, the sensing element portion is fixed by being sandwiched by the bent portions of the peripheral terminals 82. Incidentally, since the peripheral terminals penetrate the insulator, the peripheral terminals are electrically insulated from the stick-like terminal in the central region.

If a voltage is applied to the force sensing element constructed as described above between the peripheral terminals 82 and the stick-like electrode 16B, a current path is formed in the gauge portion in a central region of the joined silicon single-crystal substrates and in the gauge portion in a peripheral region of the joined silicon single-crystal substrates, as is apparent from FIG. 16. Along the current path, current flows through the gauge portions in a thickness direction of the substrates. In FIG. 16, a voltage is applied such that current flows through the current path in the direction from the first electrode to the second electrode. However, it is also appropriate to apply a voltage such that current flows through the current path in the direction from the second electrode to the first electrode.

In the fifth embodiment, at least one pair of opposed electrodes as peripheral electrodes are required so as to sandwich the sensing element portion. However, it is appropriate that a voltage be applied to at least one of the peripheral electrodes.

Figure 17:
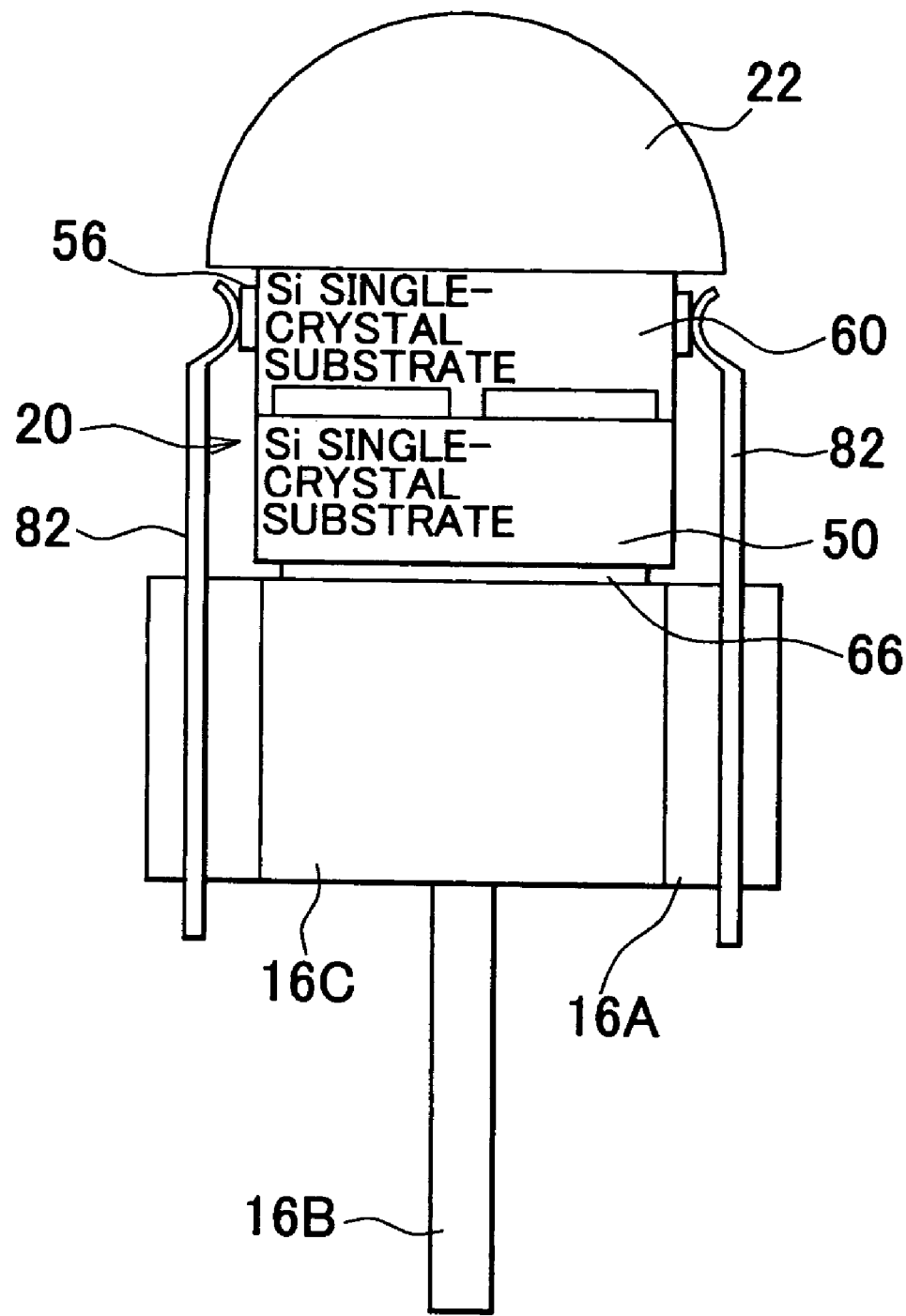
FIG. 17 is a cross-sectional view of a force sensing element on which a sensing element portion is mounted in a vertically inversed state in accordance with a modification example of the fifth embodiment.

The foregoing description deals with an example in which a silicon single-crystal substrate on which no gauge portion is formed is disposed on a silicon single-crystal substrate where a gauge portion is formed. As a modification example of the fifth embodiment, however, as illustrated in FIG. 17, the force sensing element may also be constructed such that the silicon single-crystal substrate 60 where a gauge portion is formed is disposed on the silicon single-crystal substrate 50 where no gauge portion is formed. In the case where the force sensing element is thus constructed, the first electrodes (the lateral electrodes) are formed on opposed lateral faces of the silicon single-crystal substrate where the gauge portion is formed, or the first electrode (the lateral electrode) is formed along the entire circumference of the lateral faces of the silicon single-crystal substrate where the gauge portion is formed. In this case, the second electrode is formed on the main face of the silicon single-crystal substrate 50 where no gauge portion is formed, on the side of the element fixation portion 16C. In this case as well, it is not important whether current flows through the current path in the direction from the first electrode to the second electrode or in the direction from the second electrode to the first electrode.

In the case where the lateral electrode is formed along the entire circumference of the lateral faces, the lateral electrode abuts on the bent portions of the peripheral electrode regardless of orientation of the sensing element portion. Therefore, the sensing element portion can be mounted with ease.

Figure 18:
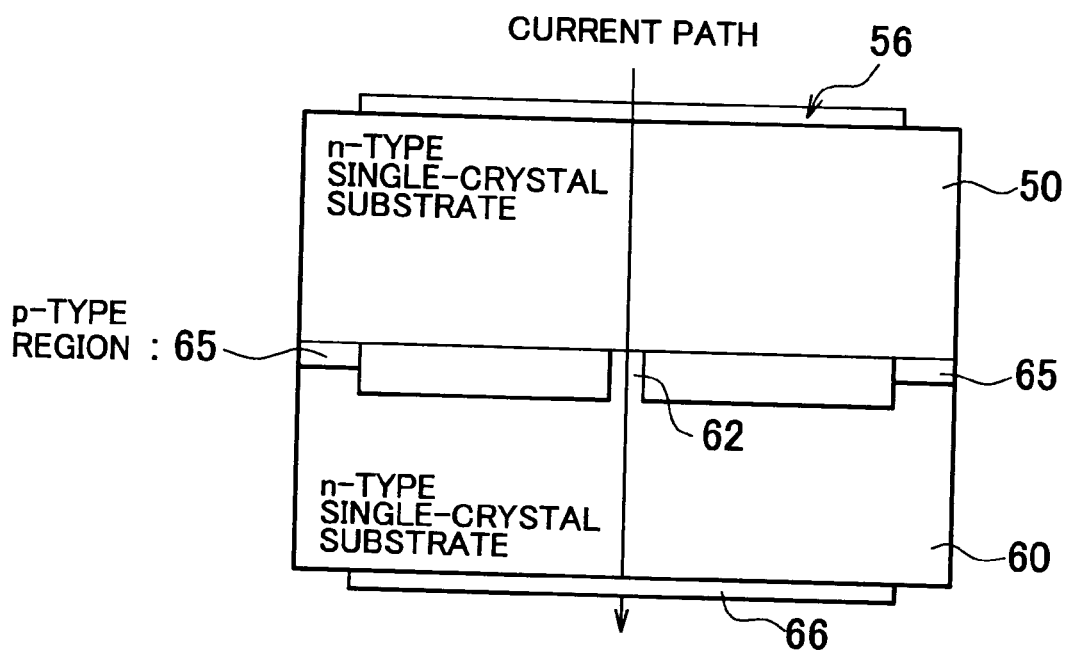
FIG. 18 is a cross-sectional view of a sensing element portion of a junction-type force sensing element in accordance with a sixth embodiment of the invention.

Next, a force sensing element (junction type) of the sixth embodiment will be described. A sensing element portion of the junction-type force sensing element of the sixth embodiment is illustrated in FIG. 18. If the balance of stresses during application of a load is taken into account, it is desirable that the gauge portion (a detecting portion) be provided only in a central region. Utilizing the principle of pn-separation, therefore, the current path illustrated in FIG. 11 is formed only in the central region (a pn-separation structure). Referring to FIG. 18, component members corresponding to those illustrated in FIG. 11 are denoted by the same reference numerals and will not be described below.

In this modification example, an n-type silicon single-crystal substrate whose (100)-face serves as a main face is used, and a p-type impurity layer 65 is formed in a region extending to a predetermined depth of the ring-like gauge portion. If the p-type impurity layer is thus formed, the ring-like gauge portion functions not as a gauge but only as a support portion for supporting the silicon single-crystal substrate that is located on the upper side. In this case, therefore, the same construction as in the case where a force sensing element portion and a force transmission body of a non-junction-type force sensing element are joined together is achieved.

In the sixth embodiment, if a p-type silicon single-crystal substrate whose (110)-face serves as a main face is used, it is appropriate that an n-type impurity layer be formed in a region extending to a predetermined depth of the ring-like gauge portion.

Figure 19:
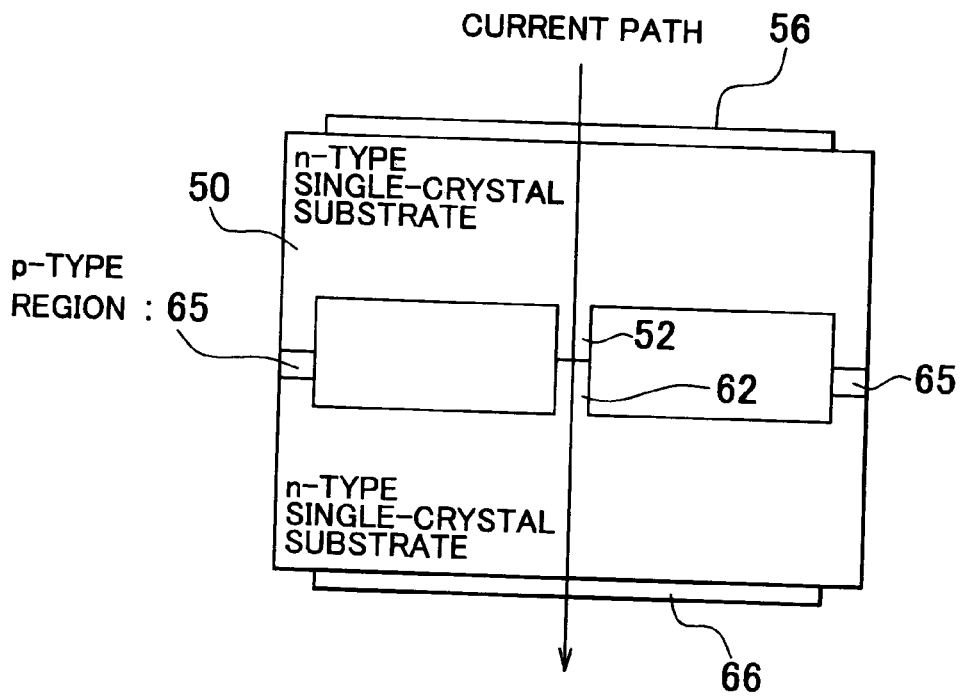
FIG. 19 is a cross-sectional view of a sensing element portion of a junction-type force sensing element in accordance with a seventh embodiment of the invention.

Next, a force sensing element (junction type) of the seventh embodiment will be described. A sensing element portion of the junction-type force sensing element of the seventh embodiment is illustrated in FIG. 19. In the seventh embodiment, the ring-like gauge portion of the sensing element portion illustrated in FIG. 14 is subjected to a modification. As in the case of the first modification example illustrated in FIG. 18, a p-type impurity layer 65 is formed in one of ring-like gauge portions formed in an n-type silicon single-crystal substrate whose (100)-face serves as a main face. In this modification example as well, it is appropriate that a p-type silicon single-crystal substrate whose (110)-face serves as a main face be used, and that an n-type impurity layer be formed in a region extending to a predetermined depth of the ring-like gauge portion.

Figure 20:
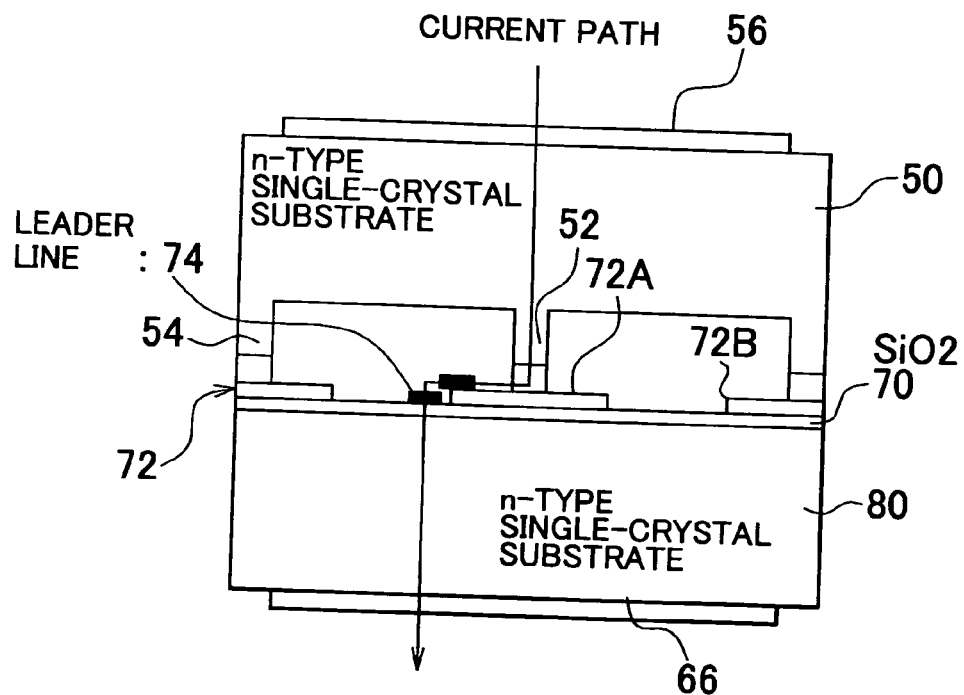
FIG. 20 is a cross-sectional view of a sensing element portion of a junction-type force sensing element in accordance with an eighth embodiment of the invention.

Next, a force sensing element (junction type) of the eighth embodiment will be described. A sensing element portion of the junction-type force sensing element of the eighth embodiment is illustrated in FIG. 20. In the force sensing element of the eighth embodiment, one of two semiconductor substrates (silicon single-crystal substrates) (the lower one of the semiconductor substrates in the eighth embodiment) is constructed of an SOI (Silicon on Insulator), whereby a current path is confined to a central region of the force sensing element.

As is apparent from FIG. 20, the silicon single-crystal substrate that is located on the upper side in the eighth embodiment is identical in construction with the substrate of the modification example of the third embodiment illustrated in FIG. 12. An SOI 80, which is located on the lower side, is a substrate obtained by forming a thin silicon membrane 72 on an oxidation layer 70 formed of an $SiO_2$ membrane. Thus, the thin silicon membrane 72 is removed of its region which does not correspond to the columnar gauge portion 52 or the ring-like gauge portion 54 formed on the upper semiconductor substrate, by means of etching or the like. As a result, a central region 72A and a peripheral region 72B of the thin silicon membrane 72 are left as they are.

A hole is bored through a region in the vicinity of the central region 72A in the oxidation layer 70, and a conductive leader line 74 establishes ohmic contact between the central region 72A and a lower region of an oxidation layer made of SOI. Then, in the same manner as described above, an SOI 80 located on the lower side and the silicon single-crystal substrate 50 located on the upper side are joined together by means of a direct bonding method.

Thus, a current path is confined to the columnar gauge portion 52 formed on the upper silicon single-crystal substrate, the central region 72A of the SOI 80, and a center portion including the leader line 74.

Figure 21:
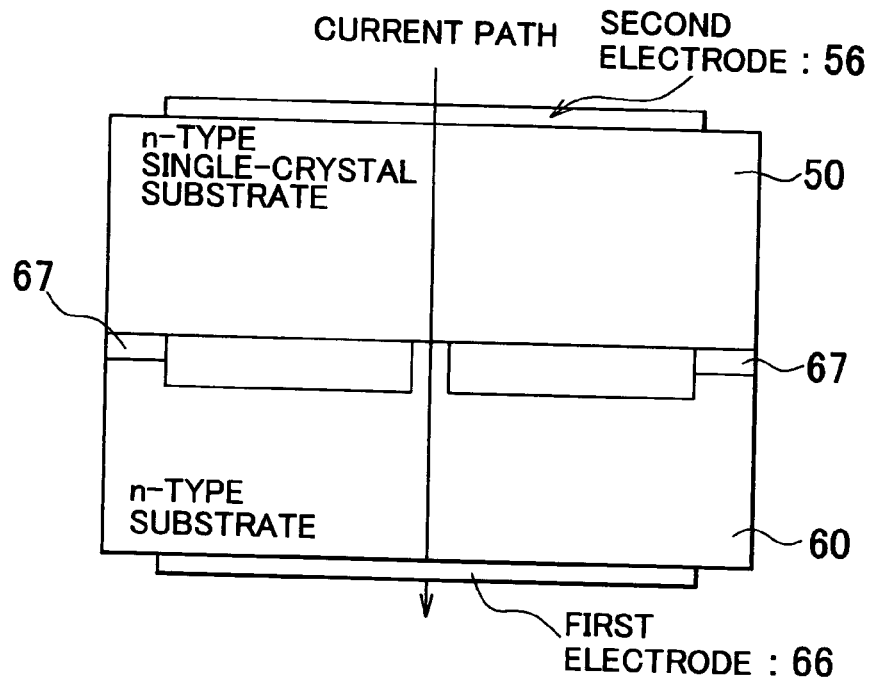
FIG. 21 is a cross-sectional view of a sensing element portion of a junction-type force sensing element in accordance with a ninth embodiment of the invention.

Next, a force sensing element (junction type) of the ninth embodiment will be described. A sensing element portion of the junction-type force sensing element of the ninth embodiment is illustrated in FIG. 21. In the junction-type force sensing element of the ninth embodiment, instead of the p-type region of the sixth embodiment illustrated in FIG. 18, an insulator membrane 67 such as an $SiO_2$ membrane or the like is formed in the ring-like gauge portion, so that a current path is confined to a center portion of the force sensing element (insulator membrane separation structure). Although FIG. 21 illustrates an example in which the insulator membrane 67 is formed on the sensing element portion of the third embodiment illustrated in FIG. 11, it is also appropriate that the insulator membrane 67 be formed on the sensing element portion of the fourth embodiment illustrated in FIG. 14.

Figure 22:
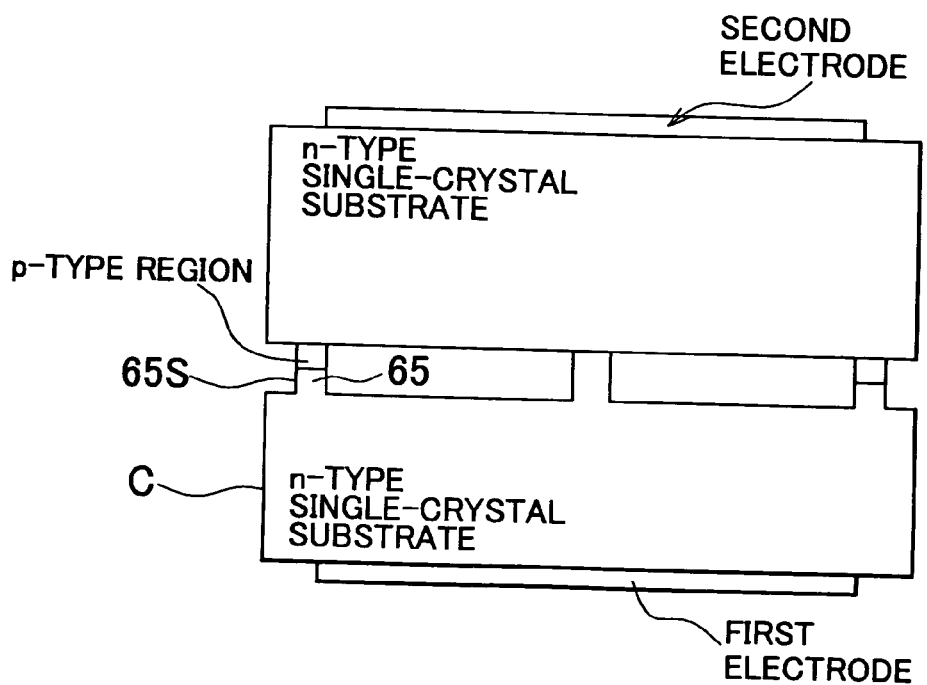
FIG. 22 is a cross-sectional view of a sensing element portion of a junction-type force sensing element in accordance with a tenth embodiment of the invention.
Figure 23:
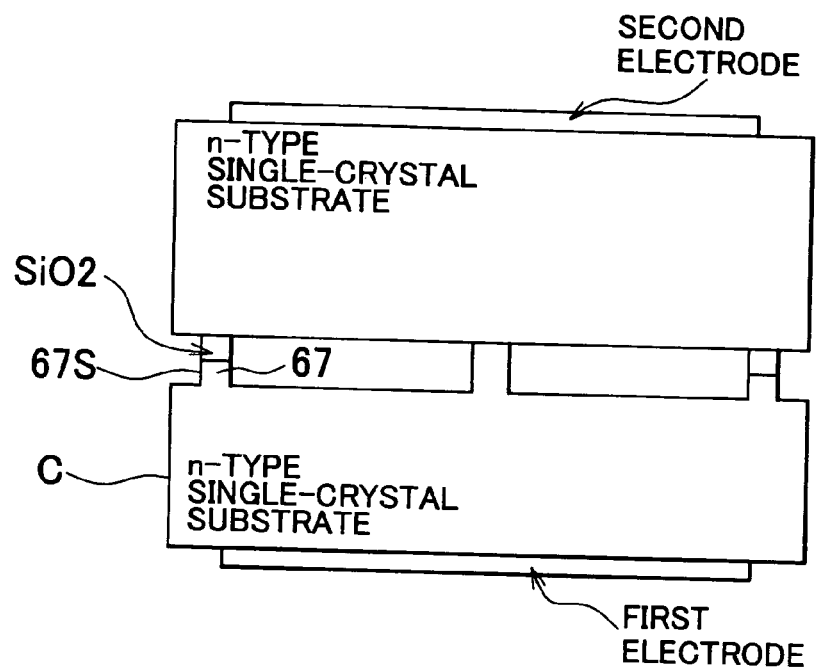
FIG. 23 is a cross-sectional view of a sensing element portion of a junction-type force sensing element in accordance with an eleventh embodiment of the invention.

In the case of the pn-separation structure or insulator membrane separation structure described above, when dicing cut is carried out to make a shift from a wafer state to a chip state, microcrack may occur in a cut face. If microcrack occurs, leak current is likely to be generated in an impurity formation portion (the p-type region described above or an n-type region) or in an insulator membrane formation portion. To eliminate this problem, according to the tenth embodiment illustrated in FIG. 22, an outer periphery 65S of the impurity formation portion 65 is disposed inwardly of a dicing cut portion C. Further, according to the eleventh embodiment illustrated in FIG. 23, an outer periphery 67S of the insulator membrane formation portion 67 is disposed inwardly of the dicing cut portion C. Thus, the impurity formation portion and the insulator membrane formation portion are subjected to dicing cut. Microcrack does not occur in these portions.

Figure 24:
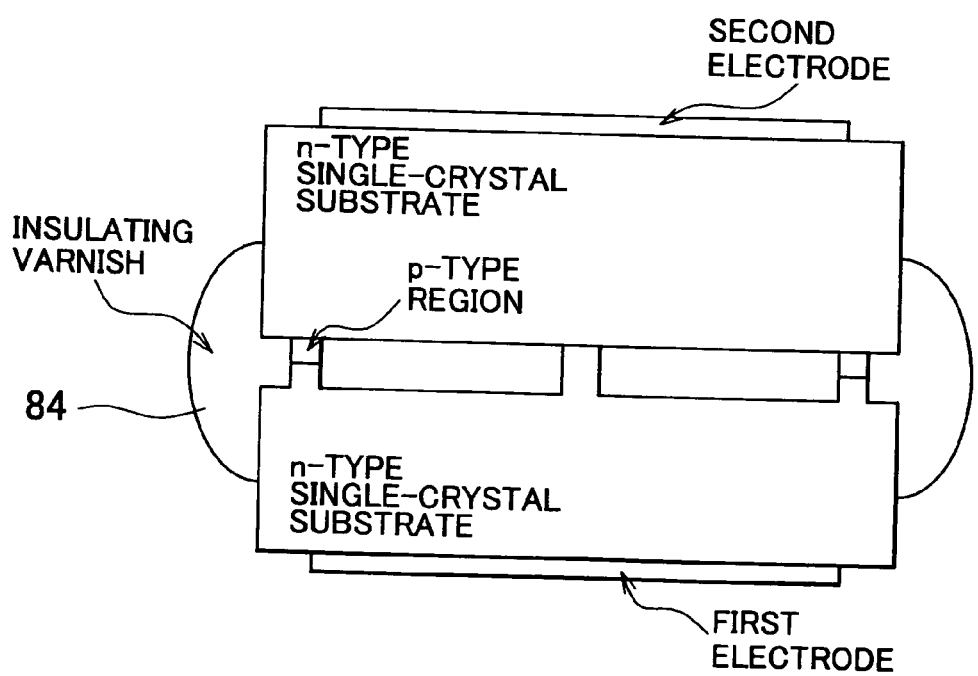
FIG. 24 is a cross-sectional view of a sensing element portion of a junction-type force sensing element in accordance with a twelfth embodiment of the invention.

Extended face leak is likely to be cased in lateral faces of the impurity formation portion and the insulator membrane formation portion, due to adhesion of movable ions or the like contained in the atmosphere. As a solution to this problem, according to the twelfth embodiment illustrated in FIG. 24, in the case of a pn-separation structure, insulating varnish or the like is applied to the lateral face of the impurity formation portion. Thus, an outside air shut-off layer 84 made of insulating varnish or the like is formed.

Figure 25:
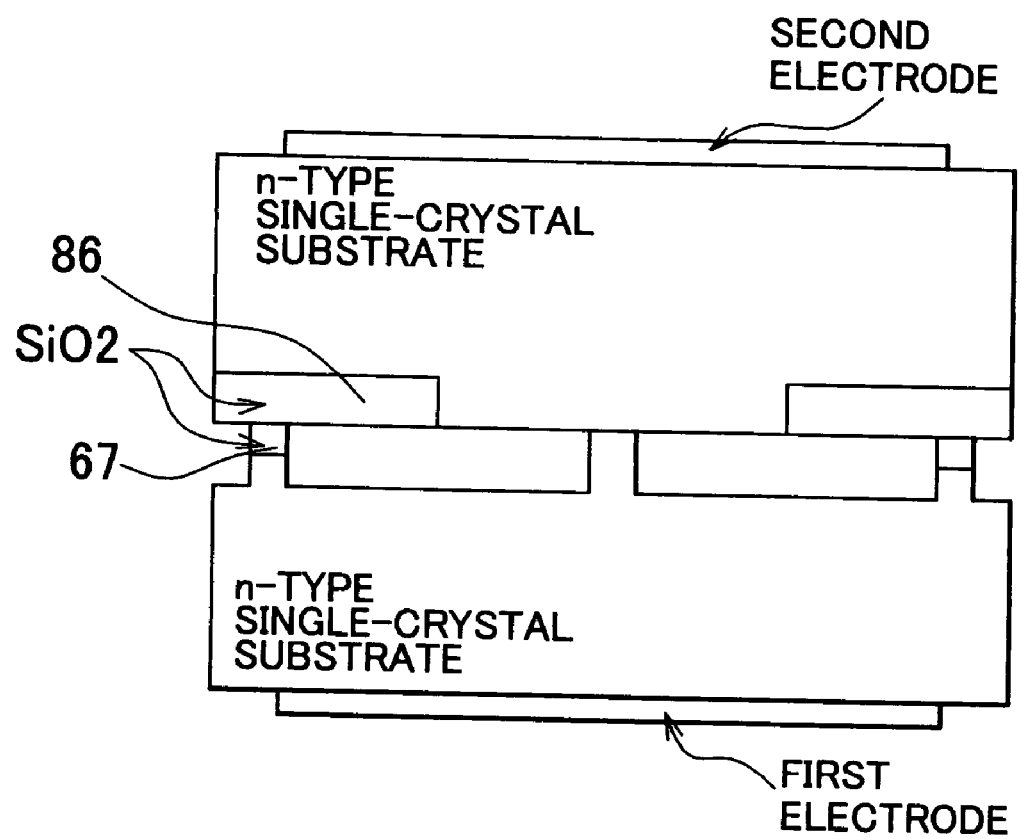
FIG. 25 is a cross-sectional view of a sensing element portion of a junction-type force sensing element in accordance with a thirteenth embodiment of the invention.

Further, according to the thirteenth embodiment illustrated in FIG. 25, in the case of an insulator membrane separation structure, an insulator membrane 86 made of an $SiO_2$ membrane or the like is formed also in a region which faces the insulator membrane formation portion 67 and which does not include a region contacting the gauge portion formed on the surface of the silicon single-crystal substrate. Thus, formation of the insulator membrane 86 makes it possible to lengthen an extended face distance and to reduce leak.

Incidentally, in the sixth to thirteenth embodiments described above, it is also appropriate that the sensing element portion be used in a vertically inversed state, and that one of the pair of the opposed electrodes be replaced with a lateral electrode. In addition, a voltage may be applied such that current flows through the current path in the direction from the first electrode to the second electrode. Alternatively, a voltage may be applied such that current flows through the current path in the direction from the second electrode to the first electrode.

The aforementioned embodiments deal with an example in which a gauge portion is formed on the surface of a silicon single-crystal substrate. Hereinafter, however, embodiments in which further structural simplification is achieved by forming a gauge portion out of a silicon single-crystal substrate itself will be described.

FIG. 26 illustrates the fourteenth embodiment of the invention. The force sensing element of the fourteenth embodiment is composed of a gauge portion 90, a first electrode 92, and a second electrode 94. The gauge portion 90 is formed of a silicon single-crystal substrate itself, which has been cut out into a rectangular shape. The first electrode 92 is formed on one main face of the gauge portion 90. The second electrode 94 is formed on the other main face of the gauge portion 90 in such a manner as to face the first electrode.

As a silicon single-crystal substrate, an n-type silicon single-crystal substrate whose (100)-face serves as a main face, a p-type silicon single-crystal substrate whose (110)-face serves as a main face, or a p-type silicon single-crystal substrate whose (111)-face serves as a main face can be used.

In the fourteenth embodiment, the main faces where the electrodes are formed serve as stress-working faces. Upon receiving a force, the gauge portion 90 is pressed in a thickness direction thereof, namely, in a thickness direction of the silicon single-crystal substrate. In the fourteenth embodiment, if a voltage is applied between the first electrode and the second electrode, a current path is formed in the thickness direction of the gauge portion. If a force is applied to the gauge portion while this state is maintained, a change in resistance of the gauge portion is caused. As a result, a change in current flowing through the gauge portion is caused. Thus, detection of the force is made possible.

In the fourteenth embodiment, each of the electrodes is formed substantially on the entirety of a corresponding one of the main faces. Therefore, a drop in output sensitivity may be caused due to a low gauge resistance. Next, the fifteenth embodiment wherein enhancement of gauge resistance is achieved by confining the region of the current path of the fourth embodiment will be described with reference to FIGS. 27A and 27B. In the fifteenth embodiment, each of the first electrode 92 and the second electrode 94 is formed on a corresponding one of the main faces via an insulator membrane 96 through which a corresponding one of contact holes 98 is bored and which is made of an $SiO_2$ membrane or the like. Each of the first electrode 92 and the second electrode 94 is electrically connected to the gauge portion 90 via a corresponding one of the contact holes 98. As illustrated in FIG. 27B, each of the contact holes 98 is bored through an area corresponding to a corresponding one of centers of the electrodes 92 and 94.

In the fifteenth embodiment, a current path (a region through which current mainly flows) 100 is formed in an area sandwiched by the contact holes of the gauge portion. Thus, the current path is so confined as to be formed in a certain area of the gauge portion. The current path is thus confined, whereby it becomes possible to realize high gauge resistance and to obtain a resistance value that is easy to handle.

In the fifteenth embodiment, each of the first and second electrodes is electrically connected to the gauge portion via a corresponding one of the contact holes. However, even in the case where only one of the first and second electrodes is electrically connected to the gauge portion via a contact hole, the current path can be confined. Therefore, it is appropriate that at least one of the first and second electrodes be electrically connected to the gauge portion via a contact hole.

Hereinafter, the sixteenth to eighteenth embodiments wherein the current path is so confined as to be formed in a certain area of the gauge portion will be described.

In the sixteenth embodiment, as illustrated in FIGS. 28A and 28B, a plurality of grooves 102 (two grooves 102 are illustrated in the drawings) are formed in the gauge portion 90 on the side where the first electrode 92 is formed, whereby the first electrode 92 is divided into a plurality of regions (three regions are illustrated in the drawings). In the sixteenth embodiment, current paths are formed in a plurality of ranges (three ranges are illustrated in the drawings) that are sandwiched by a plurality of ranges obtained by dividing the first electrode 92 and areas of the second electrode 94 corresponding to those ranges respectively. Accordingly, the region where the current paths of the sixteenth embodiment are formed is confined to a narrower range in comparison with the fourteenth embodiment (to a region that is about three-fifths as large as the region of the fourteenth embodiment according to the drawings).

The sixteenth embodiment deals with an example in which the first electrode is divided into a plurality of regions. As will be described below, however, it is also appropriate that the first electrode be formed only on an upper face of a central portion sandwiched by the grooves of the gauge portion, and that an insulator membrane made of an $SiO_2$ membrane or the like be formed on other areas of the main face of the gauge portion. In this case, the region where the current path is formed can be confined to a much narrower range in comparison with the fourteenth embodiment (to a region that is about one-fifth as large as the region of the fourteenth embodiment).

Figure 29:
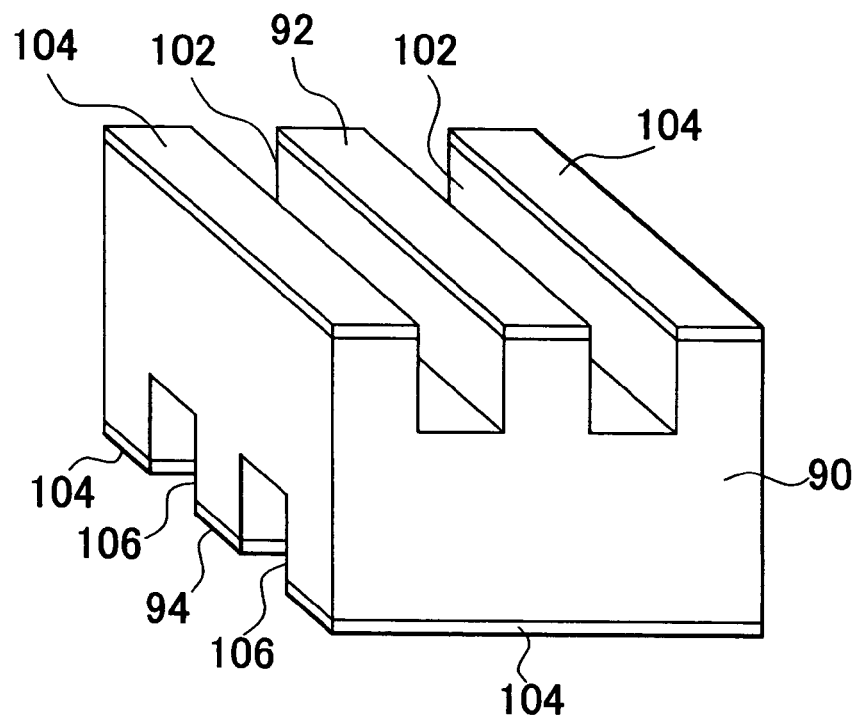
FIG. 29 is a perspective view of a force sensing element in accordance with a seventeenth embodiment of the invention.

In the seventeenth embodiment, as illustrated in FIG. 29, a plurality of the grooves 102 are formed in one main face of the gauge portion 90. The first electrode 92 is formed only on an upper face of a central area sandwiched by the grooves 102, and an insulator membrane 104 made of an $SiO_2$ membrane or the like is formed on other areas of the main face of the gauge portion. In addition, a plurality of grooves 106, which extend in a direction perpendicular to the grooves 102, are formed in the other main face of the gauge portion 90. The second electrode 94 is formed only on an upper face of a central area sandwiched by the grooves 106, and the insulator membrane 104 made of an SiO2 membrane or the like is formed in other areas of the main face of the gauge portion.

In the seventeenth embodiment, the current path is formed in the range sandwiched by the first electrode 92 and the second electrode 94. In comparison with the fourteenth embodiment, therefore, the region where the current path is formed can be confined to a much narrower range (to a region that is about one-ninth as large as the region of the fourteenth embodiment).

In the seventeenth embodiment described above, the grooves formed in one main face of the gauge portion extend perpendicularly to the grooves formed in the other main face of the gauge portion. However, it is not absolutely required that the grooves be formed in directions that are perpendicular to each other. In other words, it is sufficient that the grooves be formed in such directions as to intersect with each other.

Figure 30:
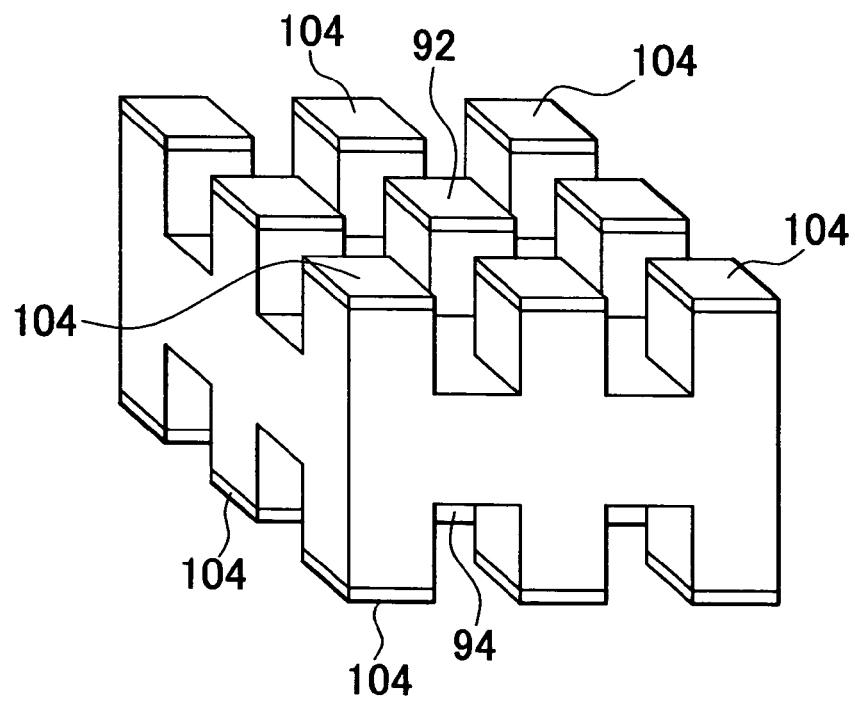
FIG. 30 is a perspective view of a force sensing element in accordance with an eighteenth embodiment of the invention.

In the eighteenth embodiment, as illustrated in FIG. 30, grid-like grooves are formed in both main faces of the gauge portion, so that a plurality of square poles are formed on both the main faces of the gauge portion. The first electrode 92 is formed on an upper face of a central one of the square poles on one of the main faces, whereas the second electrode 94 is formed on an upper face of a central one of the square poles on the other main face. The insulator membrane 104 made of an $SiO_2$ membrane or the like is formed on the upper face of each of the other square poles. In the eighteenth embodiment as well as the seventeenth embodiment, the region where the current path is formed can be confined to a narrow range. In the eighteenth embodiment, however, the first and second electrodes can further be reduced in size.

Incidentally, the areas where the insulator membranes of the force sensing elements of the seventeenth and eighteenth embodiments are formed also function as a support portion for a force transmission block. Further, a predetermined resistance value can be obtained by adjusting width and height of the areas where the electrodes are formed. In addition, although the above description deals with an example wherein a lateral wall is formed of a vertical face, wherein a bottom face is formed of a flat face, and wherein a cross section taken along a plane perpendicular to a longitudinal direction forms rectangular right-angle grooves, it is also appropriate that the cross section taken along the plane perpendicular to the longitudinal direction form V-shaped grooves. The grooves may be unequal in width and may be arranged at an unequal pitch.

A combustion sensor constructed as described above is fitted to a wall surface of a cylinder head of an engine (not shown) so that a cylinder internal pressure is applied to the metal diaphragm 12.

A pressure in a cylinder is transmitted, for example, to the force transmission body 22, the upper silicon single-crystal substrate 50, or the like via the metal diaphragm 12, a rod 45, and the connection terminal 26. The pressure thus transmitted presses the gauge portion 32 (or the gauge portions 52 and 54 and the like) along the current path. This pressing force is converted into a change in output voltage based on a piezoresistance effect resulting from a piezoresistance coefficient $\pi_{11}$ of the silicon single-crystal substrate. Accordingly, a cylinder internal pressure can be precisely measured from a change in voltage.

The foregoing description deals with examples in which a p-type silicon single-crystal substrate whose (110)-face serves as a main face, an n-type silicon single-crystal substrate whose (100)-face serves as a main face, and the like are used. However, any silicon single-crystal substrate having a crystal face equivalent to one of those faces can be used.

In general, a semiconductor circuit is formed on a (100)-face or a crystal face equivalent thereto. Accordingly, if an n-type silicon single-crystal (100)-substrate is used, an amplifier and a driving circuit can be easily combined with a semiconductor pressure sensor. Thus, a sensor integrated with a control circuit, which was hardly conceivable in the past, can now be realized.

The foregoing description deals with examples in which the gauge portion and the support portion are formed through mesa etching. However, these portions can also be formed through dicing.

In the case where the gauge portion and the support portion are formed through mesa etching, their configurations and arrangements can be determined at will. Therefore, performance enhancement of the element (structural optimization) can be achieved. In the case where the gauge portion, the support portion, and the grooves are formed through dicing, they can be formed easily without requiring an etching mask or the like. Therefore, simplification of manufacturing processes (a reduction in cost) can be achieved.

According to the invention, as described hitherto, a gauge portion is formed of a semiconductor substrate itself, and a plurality of electrodes are provided such that a current path extending in a direction corresponding to a thickness direction of the semiconductor substrate is formed in the gauge portion. Hence, there is no need to stick components together by means of glue or the like. Thus, an effect of high-precision detection of a force can be obtained.

Further, the current path in the gauge portion extends in the same direction as a force is applied thereto. This makes it unnecessary to create gauge-output wirings through wire bonding. Therefore, an effect of reduction in the number of manufacturing processes and an effect of low-cost production can be obtained.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A force sensing element comprising:
    a gauge portion which is formed of an n-type semiconductor substrate whose (100)-face serves as a main face, a p-type semiconductor substrate whose (110)-face serves as a main face, or a p-type semiconductor substrate whose (111)-face serves as a main face and which is pressed in a thickness direction of the semiconductor substrate upon receiving a force; and
    a plurality of electrodes which are electrically connected to the gauge portion such that a current path and an electric output voltage path extending in a direction corresponding to the thickness direction of the semiconductor substrate is formed in the gauge portion, and
    wherein an electric current input terminal and a sensor output terminal include a same one of the plurality of electrodes.

2. The force sensing element according to claim 1, wherein
    the current path is so confined as to be formed in a certain part of the gauge portion.

3. A force sensing element comprising:
    a semiconductor substrate;
    a gauge portion which is formed on one main face of the semiconductor substrate and which is pressed upon receiving a force; and
    a plurality of electrodes which are electrically connected to the gauge portion such that a current path and an electric output voltage path extending in a direction corresponding to a thickness direction of the semiconductor substrate is formed in the gauge portion,
    wherein a force is applied along the current path in the gauge portion, and
    wherein an electric current input terminal and a sensor output terminal include a same one of the plurality of electrodes.

4. The force sensing element according to claim 3, wherein
    a center of a region receiving a force of the gauge portion is located at a center of a region to which the force is applied.

5. The force sensing element according to claim 4, wherein
    the gauge portion is formed such that the current path is formed in a crystal direction which exhibits a high sensitivity for a transmitted force.

6. The force sensing element according to claim 3, wherein
    the gauge portion is formed such that the current path is formed in a crystal direction which exhibits a high sensitivity for a transmitted force.

7. The force sensing element according to claim 3, wherein
    the electrodes include a first electrode which is electrically connected to the gauge portion and a second electrode which is so formed on the other face of the semiconductor substrate as to face the first electrode.

8. A force sensing element comprising:
    a semiconductor substrate;
    a gauge portion which is formed on one main face of the semiconductor substrate and which is pressed upon receiving a force;
    a plurality of electrodes which are electrically connected to the gauge portion such that a current path and an electric output voltage path extending in a direction corresponding to a thickness direction of the semiconductor substrate is formed in the gauge portion; and
    a force transmission block which presses the gauge portion along the current path upon receiving a force,
    wherein the gauge portion has a piezoresistance effect, and
    wherein an electric current input terminal and a sensor output terminal include a same one of the plurality of electrodes.

9. The force sensing element according to claim 8, wherein
    a center of a region receiving a force of the gauge portion is located at a center of a region to which a force transmitted from the force transmission block is applied.

10. The force sensing element according to claim 9, further comprising:
    a force transmission body support portion which is disposed symmetrically with respect to the gauge portion so as to support the force transmission block.

11. The force sensing element according to claim 9, wherein
    the gauge portion is formed such that the current path is formed in a crystal direction which exhibits a high sensitivity for a transmitted force.

12. The force sensing element according to claim 8, wherein
    the gauge portion is formed such that the current path is formed in a crystal direction which exhibits a high sensitivity for a transmitted force.

13. The force sensing element according to claim 8, wherein
    the electrodes include a first electrode which is electrically connected to the gauge portion and a second electrode which is so formed on the other face of the semiconductor substrate as to face the first electrode.

14. A force sensing element comprising:
    a first semiconductor substrate;

a gauge portion which is formed on one main face of the first semiconductor substrate and which is pressed upon receiving a force;

a second semiconductor substrate which is joined on the side of one main face thereof to the gauge portion of the first semiconductor substrate;

a first electrode which is formed on the first semiconductor substrate; and a second electrode which is formed on the second semiconductor substrate, wherein a current path, which extends in the same direction as a force is applied to the gauge portion, is formed of the first electrode and the second electrode, and wherein gauge portion has a piezoresistance effect, and wherein an electric current input terminal and a sensor output terminal include a same one of the plurality of electrodes.

15. The force sensing element according to claim 14, wherein the first electrode is formed on at least one of the other main face and a lateral face of the first semiconductor substrate, and the second electrode is formed on at least one of the other main face and a lateral face of the second semiconductor substrate.

* * * * *